United States Patent [19]
Shu et al.

[11] Patent Number: 6,075,538
[45] Date of Patent: Jun. 13, 2000

[54] TIME AND SPACE EFFICIENT DATA STRUCTURE AND METHOD AND APPARATUS FOR USING THE SAME FOR SURFACE RENDERING

[75] Inventors: Renben Shu; Yih Lee, both of Singapore, Singapore

[73] Assignee: Institute of High Performance Computing, Singapore

[21] Appl. No.: 08/899,517

[22] Filed: Jul. 24, 1997

[30]     Foreign Application Priority Data

Jul. 25, 1996  [SG]   Singapore ............................ 96103429

[51] Int. Cl.[7] ................................................... G06T 17/20
[52] U.S. Cl. ........................................... 345/419; 382/128
[58] Field of Search ................................ 345/419, 421, 345/423, 424, 433; 382/128, 154, 171

[56]                References Cited

U.S. PATENT DOCUMENTS

| 4,821,210 | 4/1989 | Rumbaugh | 345/421 |
| 5,201,035 | 4/1993 | Stytz et al. | 345/502 |

Primary Examiner—Mark R. Powell
Assistant Examiner—Thu Nguyen
Attorney, Agent, or Firm—Lawrence Y. D. Ho; David D. Chung; Jacqueline C. T. Lui

[57]                ABSTRACT

A computationally time and space efficient data structure and method and system for using the same for surface rendering. The basis for the new data structure lies in organizing a volume data set for surface rendering into a new format where the cells needed for the surface rendering can be searched and displayed more efficiently. Given a threshold t specified by the user, the present data structure is able to efficiently identify all surface cells saving valuable processing time by providing three unique beneficial characteristics. First, given a threshold t, it can directly provide all S-cells without having to check most of the 1-cells and 0-cells such that no time is wasted on visiting the intermediate nodes. Second, it facilitates significant savings in memory space where the data structure only requires $N^3$ pointers for data storage saving memory space for all intermediate nodes, i.e. $O(N^3)$ pairs of (Min, Max). And third, it makes viable a searching algorithm which can have parallelization capabilities for finding all S-cells such that the algorithm can be efficiently used in today's workstation employing more than one processor.

8 Claims, 15 Drawing Sheets

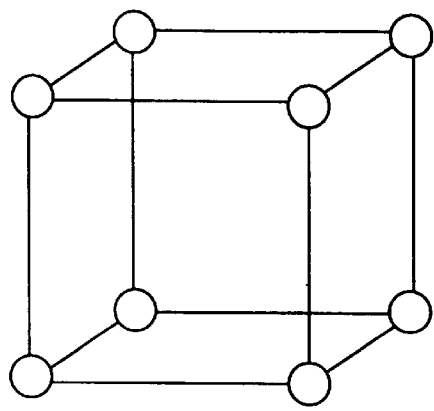
FIG. 9.1
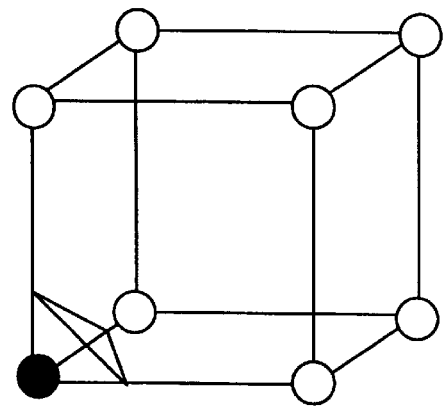
FIG. 9.2
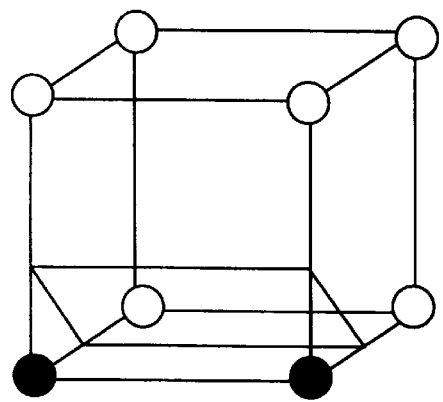
FIG. 9.3
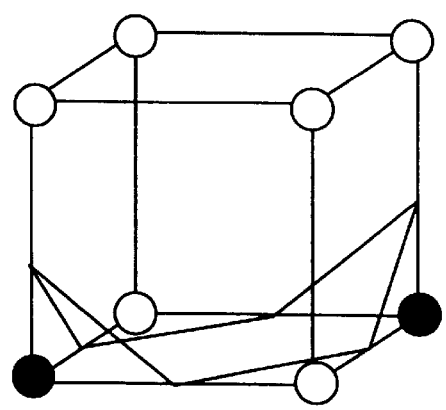
FIG. 9.4
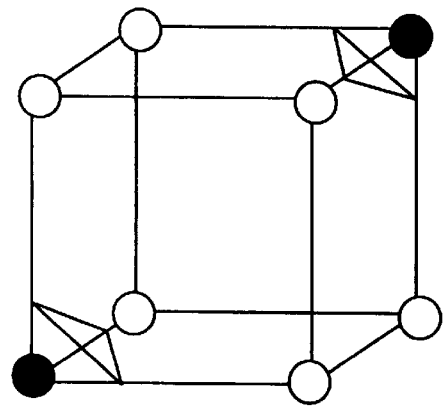
FIG. 9.5
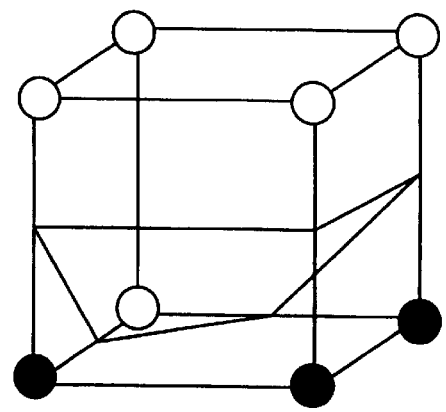
FIG. 9.6

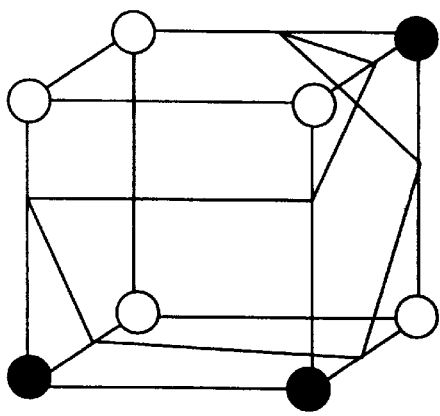
FIG. 9.7
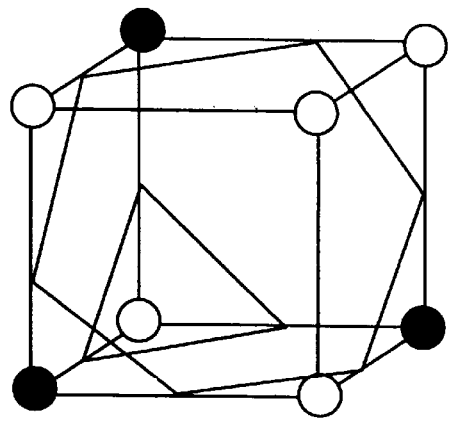
FIG. 9.8
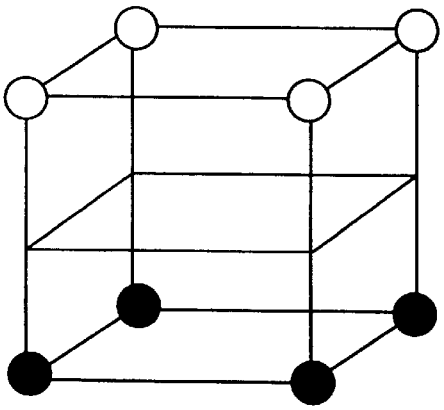
FIG. 9.9
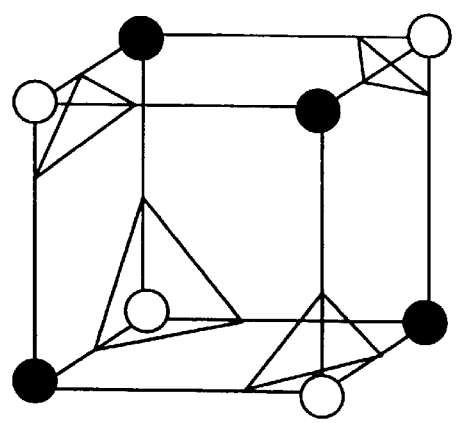
FIG. 9.10
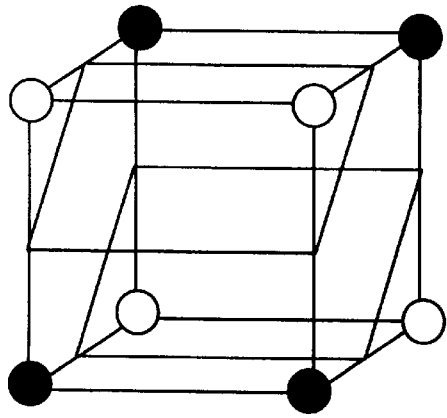
FIG. 9.11
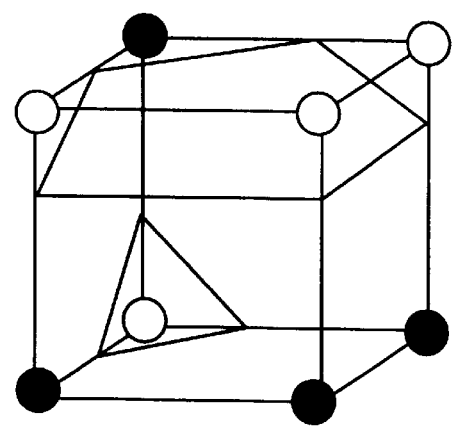
FIG. 9.12

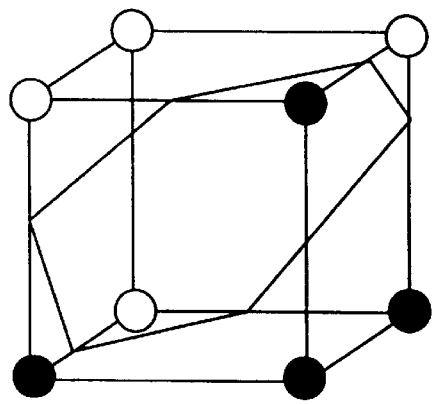
FIG. 9.13
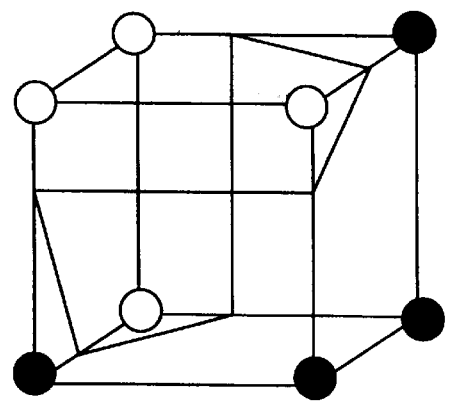
FIG. 9.14
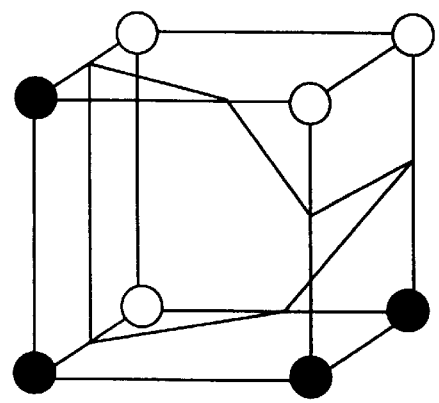
FIG. 9.15
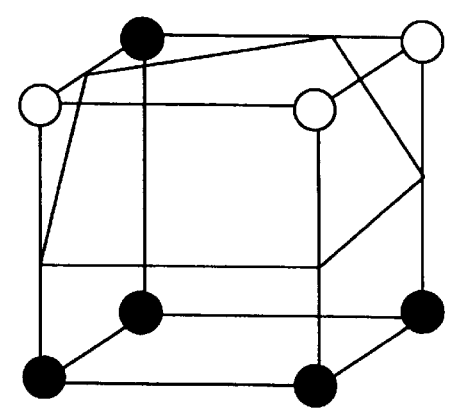
FIG. 9.16
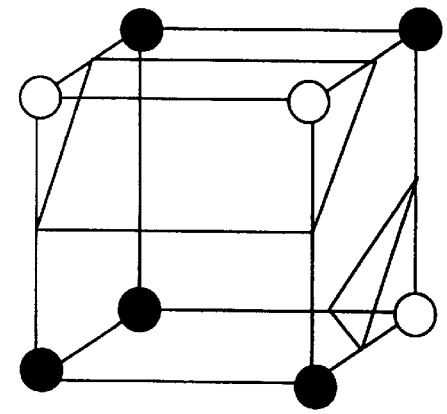
FIG. 9.17
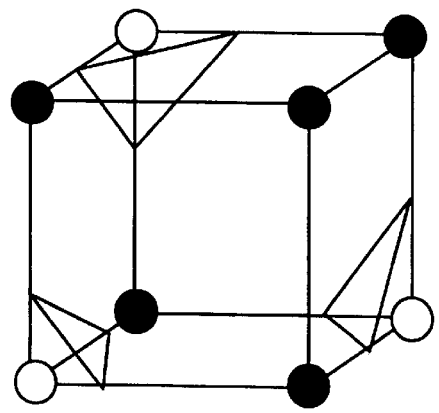
FIG. 9.18

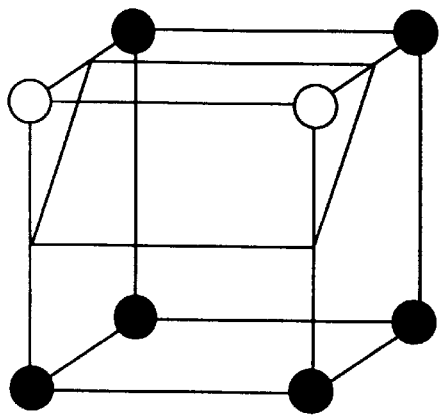
FIG. 9.19
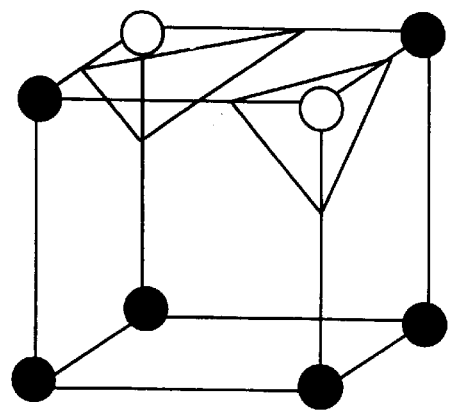
FIG. 9.20
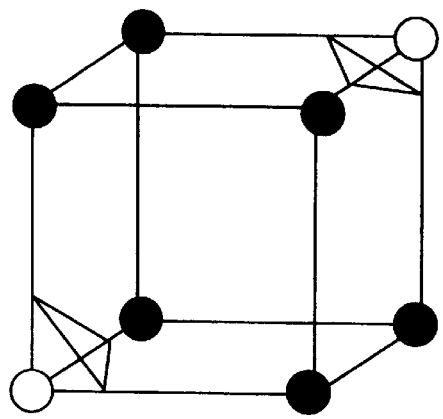
FIG. 9.21
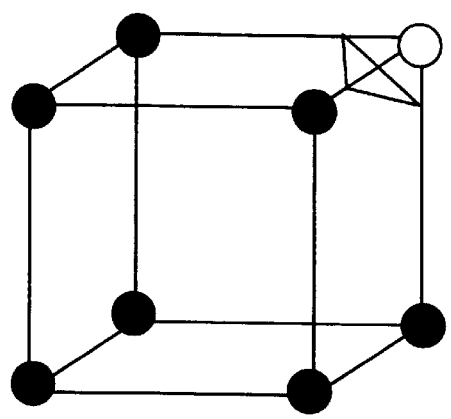
FIG. 9.22
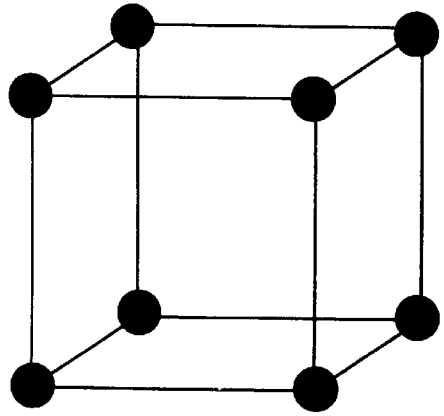
FIG. 9.23 or or

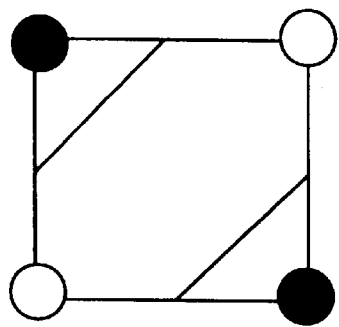 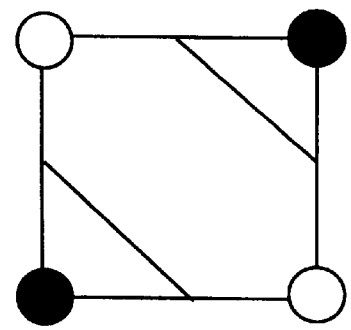
FIG. 13 C  or  FIG. 13 D

TIME AND SPACE EFFICIENT DATA STRUCTURE AND METHOD AND APPARATUS FOR USING THE SAME FOR SURFACE RENDERING

FIELD OF THE INVENTION

The present invention relates generally to three dimensional volume visualization, and particularly to a new data structure and method and system which significantly reduce computational time and space in displaying surface structure of a three dimensional object.

BACKGROUND OF THE INVENTION

Three dimensional volume visualization has been used in various applications such as in medical diagnoses, weather forecasting, molecular design, etc. There are two types of fundamental techniques which can be used for volume visualization: volume rendering and surface rendering. A few popular surface rendering techniques have been developed and extensively used in many interactive applications.

With either of these techniques, the fundamental data formation is denoted as volume data depicting a 3-dimensional space scalar field, $d=d(x, y, z)$, which represents a set of values for a certain physical characteristic of a three dimensional object. The volume data is partitioned into N×N×N identical cubes, called cells, having 6 faces and 8 voxels or vertices, each voxel being associated with the physical characteristic, e.g. density denoted as $d_{i,j,k}$, of the 3-dimensional object. There are currently a number of well-known surface rendering methods for displaying surface structure of a three dimensional object from a set of volume data as defined above. For instance, Gordon and Udupa have developed a surface tracking algorithm as fully detailed in the publication, D. Gordon and J. K. Udupa, "Fast Surface Tracking in Three-Dimensional Binary Images", Computer Vision, Graphics, and Image Processing, 45, 2, pp. 196–214, February 1989, which was successfully used in TURNKEY medical systems.

In this algorithm, Gordon and Udupa define two types of cells subject to the sign of the difference of the density value, $d_{i,j,k}$, of an object and a threshold t. If $d_{i,j,k}-t<0$ then $c_{i,j,k}$ is classified as a 0-cell; otherwise it is deemed a 1-cell. The object is deemed to contain all 1-cells and the background is deemed to contain all 0-cells. All boundary face between 1-cells and 0-cells is defined to be the object surface. The boundary face is called the B-face. Gordon and Udupa developed an algorithm called surface tracking to track and detect all such B-faces. Before the algorithm is invoked, a cell called seed which has at least one B-face is given.

The surface tracking algorithm has two main disadvantages. First, the object to be visualized must be connected and the seed must be provided. Providing the seed sometimes is not as easy as one might imagine. To illustrate this point, FIG. 1 shows an example of a 2-dimensional object which has three possible densities at individual voxels, i.e. 0, d or d'(>d>0). Given a threshold $0<t_1<d$, and using the above definition, there are 27 1-cells which form a connected object. Assuming that a seed, say, $c_{1,1}$ is given, the algorithm can track all the B-faces (in a 2-dimensional case, they are actually edges), i.e. the outlay contour of the object. However, it is quite often that this resultant contour is not the one the user wishes to see. He might adjust the threshold to $d'>t_2>d$. This results in a new object which consists of two parts. The original seed $c_{1,1}$ no longer belongs to the object and is useless for the surface tracking purpose. Two new seeds must be provided so that the algorithm can detect new boundaries for each individual part. This is obviously computationally intensive. In general, the user should be allowed to change the threshold interactively with the system to generate corresponding object images. In order to do so, there should be some mechanism to provide all seeds which are dynamically adjustable with different user-specified thresholds. Without the special mechanism, all cells must be check resulting in time complexity of $O(N^3)$.

The second disadvantage is that the algorithm generates a number of B-faces to patch the object surface. Compared with other patching techniques such as the triangulation methods known to those skilled in the art, the resultant images can have greater distortions and poorer quality.

One popular triangulation patching algorithm, known as Marching Cubes, developed by Lorensen and Cline and described in US. Pat. No. 4,719,585 and U.S. Pat. No. 4,729,098, overcomes some of the shortcomings of the Gordon and Udupa algorithm. The Marching Cube algorithm first obtains all borders of the object on each cross section and then patches them using triangles. In order to detect all cross section parts, three types of cells are defined. Given a threshold t, a cell is defined as a 1-cell if each of its eight vertices has a density greater than t, and a 0-cell if each of its eight vertices has a density less than t. A cross-sectional-cell, or an S-cell is a cell which contains some voxels with densities greater than the threshold t, and some voxels with densities less than the threshold t.

Hence, with the Marching Cube algorithm, the B-faces as defined and utilized in the Surface Tracking Algorithm no longer exist because the new definition of a 1-cell will never neighbor a 0-cell. Only S-cells contain object iso-surface. In order to triangulate each of the S-cells, Lorenson and Cline have summarized 14 rules of how to patch the surface part of an S-cell. Applying these rules on each S-cell, the object image can be nicely generated. The algorithm is called the Marching Cubes because it must march every cell once. Although the algorithm has been generally successful, it has been reported that the 14 rules contain some ambiguity which would result in images with artificial holes. Suggestions to remove the ambiguity and the artificial holes have been discussed in J. Wiuheims and A. Van Gelder, "Octree for Faster Isosurface Generation", Computer Graphics, 24(5), November, 1990, pp.57–61.

As technologies are upgraded and as higher resolution volume data become available in imaging applications, there is a greater need to reduce computational time to access the needed data and to generate the image. For example, in a modern computer tomography (CT) and magnetic resonance imaging, (MRI) with lower radiosity, they can generate volume data with much greater resolution N. While the increased resolution allows for greater accuracy and safety for diagnostic purposes, the size of the data with $O(N^3)$ complexity could severely diminish the performance of the imaging system because the checking of all cells, as required by the Marching Cube algorithm, can take $O(N^3)$ steps.

To combat this problem, researchers created new data structures to improve the speed performance. Although these data structures often occupied greater memory space, they increased the rendering speed. Rendering speed is particularly important in many of the present interactive applications where the it is necessary to generate isosurfaces of different threshold values. Hence, this was seen as a worthwhile tradeoff as memory hardware became cheaper.

One such improved data structure was developed by M. Levoy, who first up ray casting. J. Wilhelms and A. Gelder improved on this data structure by proposing a summarized-information octree (SIO) for surface rendering techniques which is particularly suited for the Marching Cubes algorithm. The SIO builds up a 3-D octree according to the geometrical neighboring relationship between cells and can be used for surface rendering algorithms such as the Marching Cubes to avoid exploring regions of little or no interest within the volume data. The savings in the processing time can be as much as 40%. However, SIO can take up enormous amount of memory space (could be as large as 40M words) in generating a large number of what-is-known-as summarized information pairs. If the dimensions of the 3-dimensional volume data set are not simply the power of two, then a substantial amount of the space could be wasted. An improvement of the SIO called BONO has been proposed in J. Wilhelms and A. Van Gelder, "Octree for Faster Isosurface Generation", Computer Graphics, 24(5), November 1990, pp.57–61.

In light of the shortcomings stated above, and the continual demand for improved speed performance and the efficient utilization of memory space for surface rendering, there is clearly a need to have a data structure and a method and system for using the same which can efficiently use the volume data to significantly improve the speed performance of surface rendering without incurring equally significant increase in the memory requirement, and which would be particularly useful in interactive applications where faster rendering speed is highly desirable.

OBJECT OF THE INVENTION

It is therefore a general object of the present invention to overcome the shortcomings stated above, and particularly to provide a data structure, method, and system which, given a threshold t, can facilitate significant increase iso-surface rendering speed without incurring equally significant increase in the memory requirement, and which would be particularly useful for interactive applications which require a fast generation of isosurfaces of different threshold values.

It is yet another object of the present invention to provide a method and system where portions of it can be easily parallelized so it can be efficiently used in today's workstation employing more than one processor.

SUMMARY OF THE INVENTION

A computationally time and space efficient data structure and method and system for using the same for surface rendering are described. The basis for the new data structure lies in organizing a volume data set for surface rendering into a new format where the cells needed for the surface rendering can be searched and displayed more efficiently. Given a threshold t specified by the user, the present data structure is able to efficiently identify all surface cells saving valuable processing time.

The present data structure overcomes the shortcomings of the previous SIO data structure by providing a new structure having three unique beneficial characteristics. First, given a threshold t, it can directly provide all S-cells without having to check most of the 1-cells and 0-cells such that no time is wasted on visiting the intermediate nodes of the SIO. Second, it facilitates significant savings in memory space where the data structure only requires $N^3$ pointers of SIO for data storage saving memory space for all intermediate nodes, i,e. $O(N^3)$ pairs of (Min, Max). And third, it makes viable a searching algorithm which can have parallelization capabilities for finding all S-cells such that the algorithm can be efficiently used in today's workstation employing more than one processor.

Two data structures are described. The first is called Two-Way Sorted Table (TWS) and a second called Comprehensive TWS Table (CTWS). The first assumes a volume data set which is evenly distributed and the length of the data is of one byte. The second is a modified version of the first for more general applications where the volume data which is not evenly distributed.

The TWS is generated from a volume data set depicting a 3-dimensional space scalar field, d=d(x, y, z), where assuming a subspace range from [0, N], where N>0 and N is an integer, for each x, y and z direction, the subspace is further partitioned by another three sets of planes, x, y, z=1, ..., N−1 resulting in N×N×N identical small cubes $c_{i,j,k}$ with each cube having 6 faces and 8 voxels (i.e., vertices), $v_{i,j,k}, v_{i,j,k+1}, v_{i,j+1,k}, ..., v_{i+1,j+1,k+1}$. A summarized information pair ($\min_{i,j,k}$, $\max_{i,j,k}$), where $\min_{i,j,k}$=minimum of the density values at each of the eight corners of the cell$_{i,j,k}$ and $\max_{i,j,k}$=maximum of the density values at each of the eight corners of the cell$_{i,j,k}$ and a pointer $pt_{i,j,k}$ pointing to its corresponding $c_{i,j,k}$ are generated for each $c_{i,j,k}$ are first generated. An equivalent relation is defined as R={($c_{i,j,k}$, $c_{i',j',k'}$)| if $\min_{i,j,k}$=$\min_{i',j',k'}$} to partition all cells into equivalent classes, $CL_q$, where there are Q such equivalent classes, and each $CL_q$ contains all nodes $c_{i,j,k}$ with $\min_{i,j,k}$=$\min_q$, where $\min_q$ is called the characteristic value of the $CL_q$. Q classes are sorted according to increasing order of characteristic value $\min_0$~$\min_{Q-1}$ to get a permutation of CLs so that $CL_{s(q)}$ is in the left of $CL_{s(q')}$ if and only if the $\min_{s(q)}$<$\min_{s(q')}$. After the classes are sorted, the classes are renamed as $CL_0, CL_1, ..., CL_{Q-1}$. All nodes for each class $CL_q$ having an even index q are internally sorted in an increasing order of the max-field, and all nodes for each class $CL_q$ having an odd index q are internally sorted in a decreasing order of the max-field. A Pointer Array, PA, is generated, taking only the pointer part of each node in each $CL_q$ to fill into a one dimension array. The filling sequence strictly follows the order of each cell appeared in the renamed and sorted set, $CL_0, CL_1, ..., CL_{Q-1}$. A Class Length List, CLL, is generated which has q positive integers $SIZE_q$=$\|CL_q\|$ for q=0, 1, ..., Q−1.

An algorithm called Two-Way Searching Algorithm is used to find all the S-cells. Generally, the algorithm begins by finding S-cells in $CL_0$ and $CL_1$, then $CL_2$ and $CL_3$ .... This pair-by-pair visiting of ($CL_0$, $CL_1$), ($CL_2$, $CL_3$), ... ($CL_{2i}$, $CL_{2i+1}$), will be terminated as soon as one 1-cell is found. To visit each pair of $CL_{2i}$ and $CL_{2i+1}$, the algorithm first identifies the last cell of $CL_{2i}$. According to the data structure of Pointer Array, it should be pointed to by Index−1, where $Len_i$ is the length of $CL_i$. The algorithm then searches for S-cells of $CL_{2i}$ along index decreasing direction until a 0-cell is identified or all cells in $CL_{2i}$ are tested; then it updates the Starting_Index by Starting_Index+1 and starts to search all S-cells of $CL_{2i+1}$ along index increasing direction.

The CTWS modifies the TWS to handle situations where the scalar field is not evenly distributed. Generally, the modification of the TWS involves the combining of small CLs to be a large one. A $CL_j$ is defined to be combinable, if its size i.e. number of cells it contains, is less than $N^2$. Otherwise it is deemed non-combinable. The CTWS generating algorithm combines some combinable neighboring CLs to be a bigger one so as to maintain the total number of CLs to be less than 2N. The searching algorithm also undergoes a slight modification.

There are currently at least three variations of the Marching Cubes Algorithms available for rendering and displaying the iso-surface of a 3-dimensional object from the volume data. These are Marching Cubes, Discrete Marching Cubes, and non-linear Marching Cubes algorithms. These algorithms can be used in conjunction with the present data structures and S-cell searching algorithms to display the surface structure, once all or some of the S-cells have been located.

BRIEF DESCRIPTION OF THE DRAWINGS

FIG. 9.1–9.23 illustrate the fundamental configuration table for Marching Cubes-type algorithm.

FIG. 11A through FIG. 12B illustrate how ambiguity can occur.

DETAILED DESCRIPTION OF INVENTION

Figure 1:
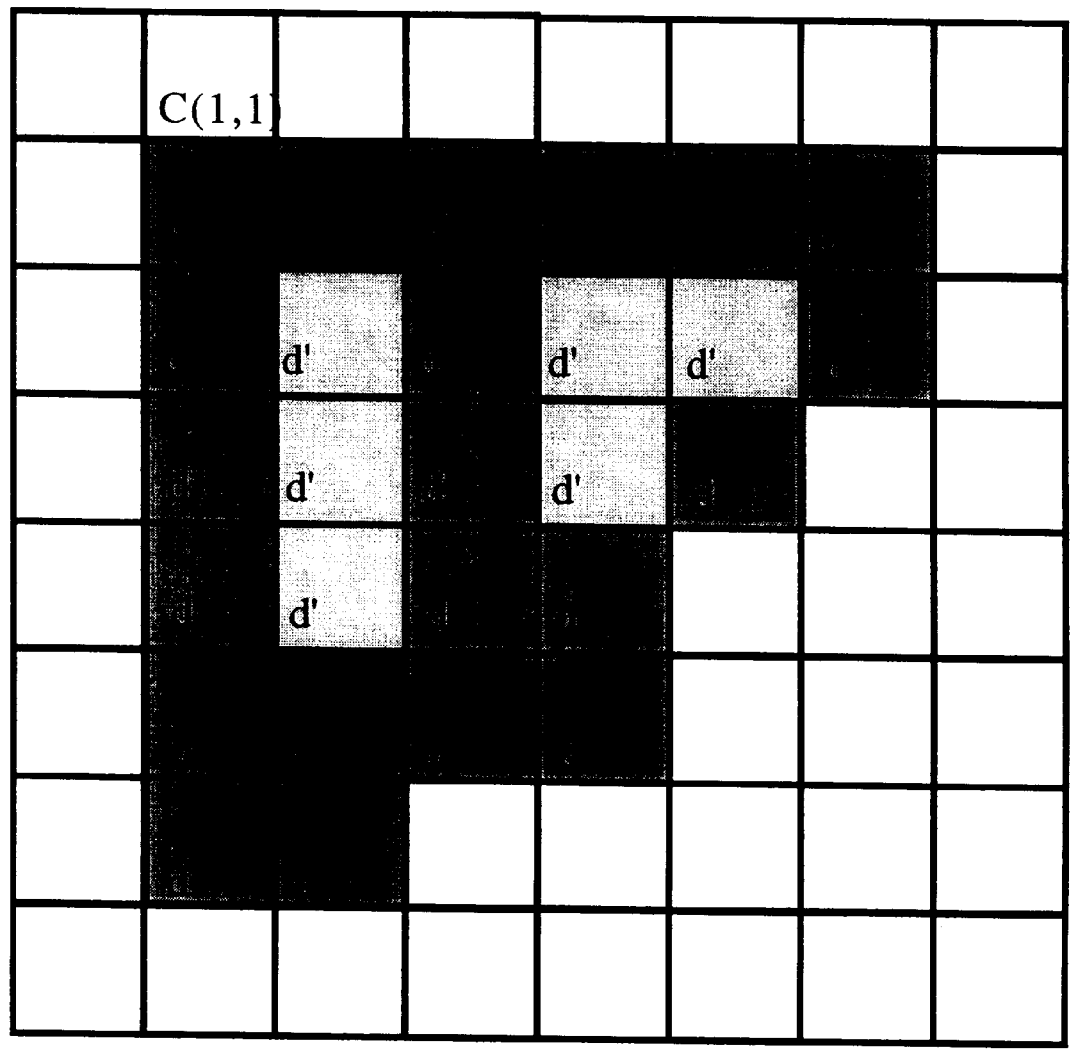
FIG. 1 is an illustration of volume data used for prior art surface tracking algorithm.

A computationally time and space efficient data structure and method and system for using the same for surface rendering are described. The basis for the new data structure lies in organizing a volume data set for surface rendering into a new format where the cells needed for the surface rendering can be searched and displayed more efficiently. In creating the new data structure, an octree, or more specifically, summarized information octree, is first prepared.

Although the principles behind octrees and, specifically, summarized information octrees (SIOs) are generally well known to those skilled in the art, some discussion of a SIO is needed so that one can understand the limitations of this data structure, and more importantly, the way in which the present data structure incorporates the elements of the SIO while overcoming some of its shortcomings. To better illustrate the points, a sample volume data shall be used to illustrate the steps and principles behind the creation of the SIO and also to illustrate other aspects of the present invention.

To simply the illustration, the sample data will relate to a 2-dimensional summarized quadtree, rather than a 3-dimensional summarized information octree. However, one skilled in the art can readily translate the steps and principles of the quadtree example to that of an octree, and more particularly, to an SIO. Therefore, it should be understood that the 2-dimensional to quadtree sample is presented here only as a way of simplifying the illustration, and not as limiting the scope of the present invention to 2-dimensional cases only. Furthermore, although the description below will make frequent references to density values as comprising the volume data set, it should be understood that values associated with physical characteristics of a 3-dimensional object other than density can also be used to define the volume data set. Moreover, although the description makes references to N×N×N volume data for illustration purposes, it should be understood that the present method can be used in parallel for any N1×N2×N3 volume data, and for any integer N1, N2, and N3.

The volume data set depicting a 3-dimensional space scalar field, d=d(x, y, z), which in this case represents a set of density values, can be defined as follows. Assuming a subspace range from [0, N] for each x, y and z direction, the subspace is further partitioned by another three sets of planes: x, y, z=1, ..., N−1. This results in N×N×N identical small cubes $c_{i,j,k}$ with each cube being called a cell. A cell $c_{i,j,k}$ has 6 faces and 8 voxels (i.e., vertices), $v_{i,j,k}$, $v_{i,j,k}$30 1, $v_{i,j+1,k}$, ..., $v_{i+1,j+1,k+1}$. The field value at voxel v,), is denoted by $d_{i,j,k}$=d(i, j, k). The whole set of the (N+1)×(N+1)×(N+1) $d_{i,j,k}$ is called 3-dimensional volume data or simply volume data.

Octree, or complete octree, is a tree where every node, except for all leaf nodes, has exactly eight sons. There is another octree called incomplete octree where some non-leaf nodes have less than eight sons. Using these two octrees, one can construct a standard SIO or BONO.

Beginning first with the SIO, a complete octree with depth n, the leaf nodes of the octree are associated with N×N×N cells, $c_{i,j,k}$, of a volume data set. The association is made by summarizing the minimum and maximum density values of 8 vertices of each cell $c_{i,j,k}$ as a pair of values, $min_{i,j,k}$ $max_{i,j,k}$, and attaching the pair to a leaf node $c^n_{i,j,k}$ in the SIO. Here, $c^q_{i,j,k}$ is denoted to be a node in the q-level of the octree, N×N×N pairs are associated with N×N×N nodes $c^n_{i,j,k}$, of the octree with depth n=LogN. Then one can compute the summarized information pair $(min^q_{i,j,k}, max^q_{i,j,k})$ for each intermediate node $C^q_{i,j,k}$ in a higher level q of the octree until a summarized information pair at the root is computed. The formula for computing the summarized information of nodes in q-level is as follows:

$$\min^q{}_{i,j,k} = \min_{\text{for } d0, d1 \text{ and } d2=0 \text{ and } 1}(\min^{q+1}{}_{2i+d0, 2j+d1, 2k+d2})$$

for i, j, k=0, 1, 2, ..., $2^{q-1}$.

Figure 2:
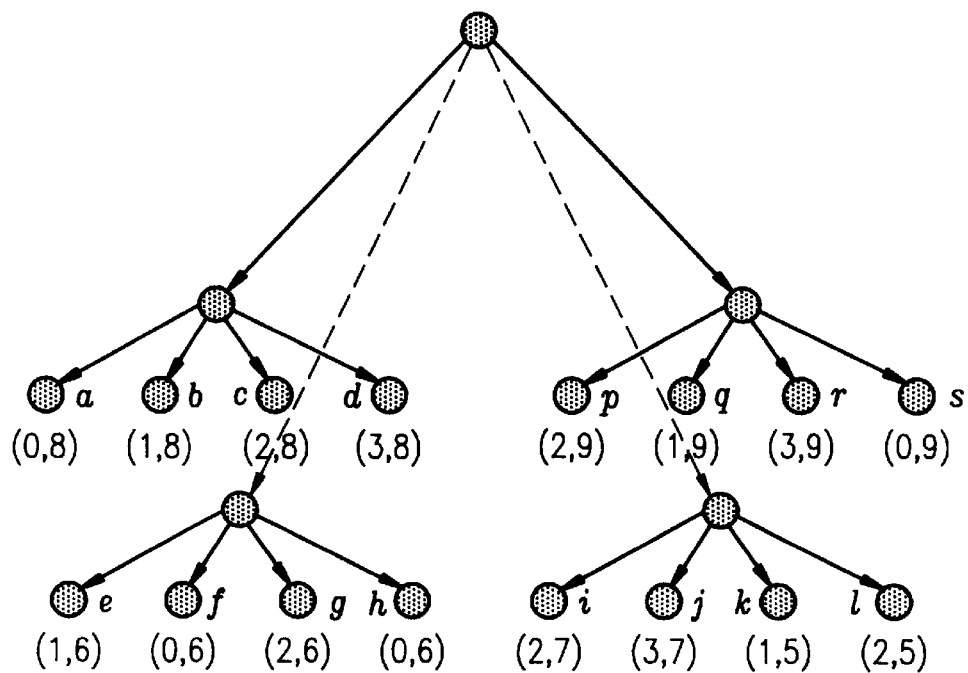
FIG. 2A shows a 2-dimensional data set which was used to generate the quadtree of FIG. 2C.
FIG. 2B shows the 2-dimensional data set of FIG. 2A superimposed with a 2-dimensional object.
FIG. 2C shows a summarized information quadtree generated from a 2-dimensional data set.

To better illustrate the points above, FIG. 2C shows a 2-dimensional summarized information quadtree depicting a 4×4 pixel space generated from the 2-dimensional data set of FIG. 2A. The relationship between the data set of FIG. 2A with a 2-dimensional object can be seen in FIG. 2B, where the object is superimposed onto the data field. Note that the quadtree of FIG. 2C is made up values representing only the minimum and maximum pair from a set of four density values for each cell in the volume data set of FIG. 2B and 2C. For the 3-dimensional situation, each cell of the volume data would have 8 density values at each voxel, and the resulting SIO would have 8 sons rather than 4.

This SIO data structure has already been adapted for the Marching Cubes algorithm to explore the volume data contents and to reduce the time spent on examining nonrelevant cells. The advantages of using the SIO data structure rather than using the volume data directly can be realized by examining the following properties of an SIO data structure.

1: Given a threshold t and a node $c^q_{i,j,k}$ with summarized information ($min^q_{i,j,k}$, $maxq_{i,j,k}$), if $max^q_{i,j,k}<t$, then each leaf cell $C^n_{i,j,k}$ contained in $C^q_{i,j,k}$ (i.e. it is a child of $C^q_{i,j,k}$ is a 0-cell.

2: Given a threshold t and a node $c^q_{i,j,k}$ if $min^q_{i,j,k}>t$, then each leaf cell $C^n_{i,j,k}$ contained in $C^q_{i,j,k}$ is a 1-cell.

3: Given a threshold t and a node $c^q_{i,j,k}$ if $min^q_{i,j,k}<t<max^q_{i,j,k}$ then there is at least one leaf cell $C^n_{i,j,k}$ contained in $C^q_{i,j,k}$ is an S-cell.

In using these properties, a searching algorithm can visit the octree from its root towards its leaves and effectively find all S-cells. When a node $c^q_{i,j,k}$ is visited, and if $max^q_{i,j,k}<t$, or, $min^q_{i,j,k}>t$, then there is no need to further visit all its children belonging to this node. Otherwise, each of its sons must be visited. This recursively defined a way to traverse the octree and guarantee to find all S-cells. The above idea can be generalized for other applications where the dimension N might not be a power of 2. For a given threshold t, the Marching Cubes algorithm must normally march all $N^3$ cells one by one. However the SIO data structure allows the Marching Cubes algorithm to find all S-cells without having to "march" every cell in the volume data set, and hence saving 30~70% of the time it would take to check all cells.

Although the use of SIO has improved the overall performance of the Marching Cubes algorithm, two noticeable shortcomings exist. First, the SIO data structure takes up enormous amount of computational memory space because to build the SIO, $O(N^3)$ pointers for all cells and the $O(N^3)$ summarized information pairs must be used (For BONO, a similar amount of space is needed too). As N increases, the system for storage will become expensive and will deteriorate the system performance. For some applications, the space of the octree occupied could be as much as 40 million of words. And second, it does not facilitate an optimal searching routine for locating the S-cells where given a threshold t, the algorithm must visit the SIO by checking all of the summarized information pairs and compute the locations of nodes from its root towards its leaves. In the best case scenario, the cost is O(S); in the worst case, however, it is $O(N^3 \log N)$, where S is the iso-surface size of the object subject to a particular threshold.

The present data structure, however, overcomes these shortcomings by providing a structure having three unique beneficial characteristics. First, given a threshold t, it can directly provide all S-cells without having to check most of the 1-cells and 0-cells such that no time is wasted on visiting the intermediate nodes of the SIO. Second, it facilitates significant savings in memory space where the data structure only requires $N^3$ pointers of SIO for data storage saving memory space for all intermediate nodes, i.e. $O(N^3)$ pairs of (Min, Max), And third, it makes viable a searching algorithm which can have parallelization capabilities for finding all S-cells such that the algorithm can be efficiently used in today's workstation employing more than one processor.

The following text shall describe two types of data structure, the first called Two-Way Sorted Table (TWS) and a second called CTWS. The first assumes a volume data set which is evenly distributed and the length of the data is of one byte. The second is a modified version of the first for more general applications where the volume data which is not evenly distributed and the length of the data is more than one byte long. Although these two data structures organize the volume data slightly different from each other, one should understand that they both have the beneficial properties described above.

There are of course many ways to create a data structure having the same or similar properties as the data structures described herein. However, as a way of fully disclosing the way to make and use the present invention, a preferred set of steps will be described below. However, some of the steps may be implemented in a different fashion than as described below without significantly affecting the resulting data structure. For instance, as a convention of convenience, the steps frequently refer to various indices. In some cases, a distinction is made between an odd and even index. One skilled in the art should understand that these characterization merely serves to distinguish subsets of the volume data having different set of characteristics and does not carry any significance per se. In other instances, the subsets are sorted to achieve a particular order or sequence. It is contemplated by the inventors that these sorting routines can take on many forms and may be performed in slightly different order or manner than the specifically described below without significantly affecting the outcome. Hence, one skilled in the art should not construe the following steps as being the only way to produce the data structure within the scope of the present invention.

1. TWS Data Structure

The TWS data structure is generated from a volume data set depicting a 3-dimensional space scalar field, $d=d(x, y, z)$, where assuming a subspace range from [0, N] for each x, y and z direction, the subspace is further partitioned by another three sets of planes, x, y, z=1, ..., N-1 resulting in N×N×N identical small cubes $c_{i,j,k}$ with each cube having 6 faces and 8 voxels (i.e., vertices), $v_{i,j,k}$, $v_{i,j,k}+1$, $V_{i,j+1,k}$, ..., $v_{i+1,j+1,k+1}$. For ease of illustration and understanding, the data set from FIG. 2A shall be used to illustrate the principles behind each of the steps, As mentioned above, FIG. 2A is a data set for a 2-dimensional case and not a true 3-dimensional volume data set. Therefore, the resulting data structure for this example will be a quadtree and not an octree. However, the steps for generating both a quadtree and an octree as related to the present invention are basically identical and therefore, the quadtree example should aid the reader in understanding the principles behind generating the TWA data structure.

A summarized information pair ($min_{i,j,k}$, $max_{i,j,k}$) and a pointer $pt_{i,j,k}$ pointing to its corresponding $c_{i,j,k}$ are first generated for each $c_{i,j,k}$. Using the data from FIG. 2A, this step generates the leaf nodes for the quadtree of FIG. 2C, the summarized information pairs being, (0,8), (1,8), (2,8), (3,8), (1,6), (0,6), (2,6), (0,6),
(2,7), (3,7), (1,5), (2,5), (2,9), (1,9), (3,9), (0,9)

with the pointers, a, b, c, d, e, f, g, h, i, j, k, l, p, q, r, s, respectively.

An equivalent relation is defined as $R=\{(c_{i,j,k}, c_{i',j',k'}) |$ if $min_{i,j,k}=min_{i',j',k'}\}$ to partition all cells into equivalent classes, $CL_q$, where there are Q such equivalent classes, and each $CL_q$ contains all nodes $c_{i,j,k}$ with $min_{i,j,k}=min_q$, where $min_q$ is called the characteristic value of the $CL_q$. Using the quadtree of FIG. 2C, this step generates the following classes:

$CL_0=(a,f,h,s)$, $CL_1=(c,g,i,l,p)$, $CL_2=(d,j,r)_1$, $CL_3=(b,e,k,q)$

Q classes are then sorted according to increasing order of characteristic value $min_0 \sim min_{Q-1}$ to get a permutation of CLs:

$CL_{s(0)}$, $CL_{s(1)}$, ..., $CL_{s(q-1)}$ so that $CL_{s(q)}$ is in the left of $CL_{s(q')}$ if and only if the $min_{s(q)}<min_{s(q')}$. Using the sample classes above, this step arranges the classes in the following sequence:

$CL_0=(a,f,h,s)$, $CL_3=(b,e,k,q)$, $CL_1=(c,g,i,l,p)$, $CL_2=(d,j,r)$

After the classes are sorted, the classes are renamed as $CL_0$, $CL_1, \ldots, CL_{Q-1}$. Using the sample classes above, this step results in the following:

$CL_0=(a,f,h,s)$, $CL_1=(b,e,k,q)$, $CL_2=(c,g,i,l,p)$, $CL_3=(d,j,r)$

All nodes for each class $CL_q$ having an even index q are internally sorted in an increasing order of the max-field. Using the sample classes above, this step results in the following for the classes having even index q:

$CL_0=(f,h,a,s)$, $CL_2=(l,g,i,c,p)$

All nodes for each class $CL_q$ having an odd index q are internally sorted in a decreasing order of the max-field. Using the sample classes above, this step results in the following for the classes having odd index q:

$CL_1=(q,b,e,k)$, $CL_3=(r,d,j)$

More formerly, the sorting step above can be described as follows: for any two $c_{i,j,k}$ and $c_{i',j',k'}$, $c_{i,j,k}$ will be in the left of $c_{i',j',k'}$ if and only if $(\max_{i,j,k}-\max_{i',j',k'})(-1)^q < 0$.

A Pointer Array, PA, is generated, taking only the pointer part of each node in each $CL_q$ to fill into a one dimension array. The filling sequence strictly follows the order of each cell appeared in the renamed and sorted set, $CL_0, CL_1, \ldots, CL_{Q-1}$. Obviously, the size of the array is always to be $N^3$ with each element to be a pointer pointing to a cell. Using the sample classes above, this step results in the following Pointer Array, PA:

PA=(f, h, a, s, q, b, e, k, l, g, i, c, p, r, d, j)

A Class Length List, CLL, is generated which has q positive integers $SIZE_k=\|CL_q\|$. Using the sample classes above, this step results in the following CLL:

CLL=(4, 4, 5, 3)

It should be emphasized here that in the above steps, two types of sorting using key minimum and maximum fields have been performed. That is one is to use minimum of each $CL_i$, i.e. the min-field of each cell in $CL_i$ to sort equivalent classes; another use max-field of each cell to sort cells in each class. The first sorting is done according to increasing order of min-field for all $CL_i$ while the second type of sorting is done according to increasing order of max-field for all $CL_{2i}$ and decreasing order of max-field for $CL_{2i+1}$, hence the name Two-Way Sorted Table. For a given 3D volume data set, the above procedure can be used once to generate a Two Way Sorting Table, TWS.

Figure 3:
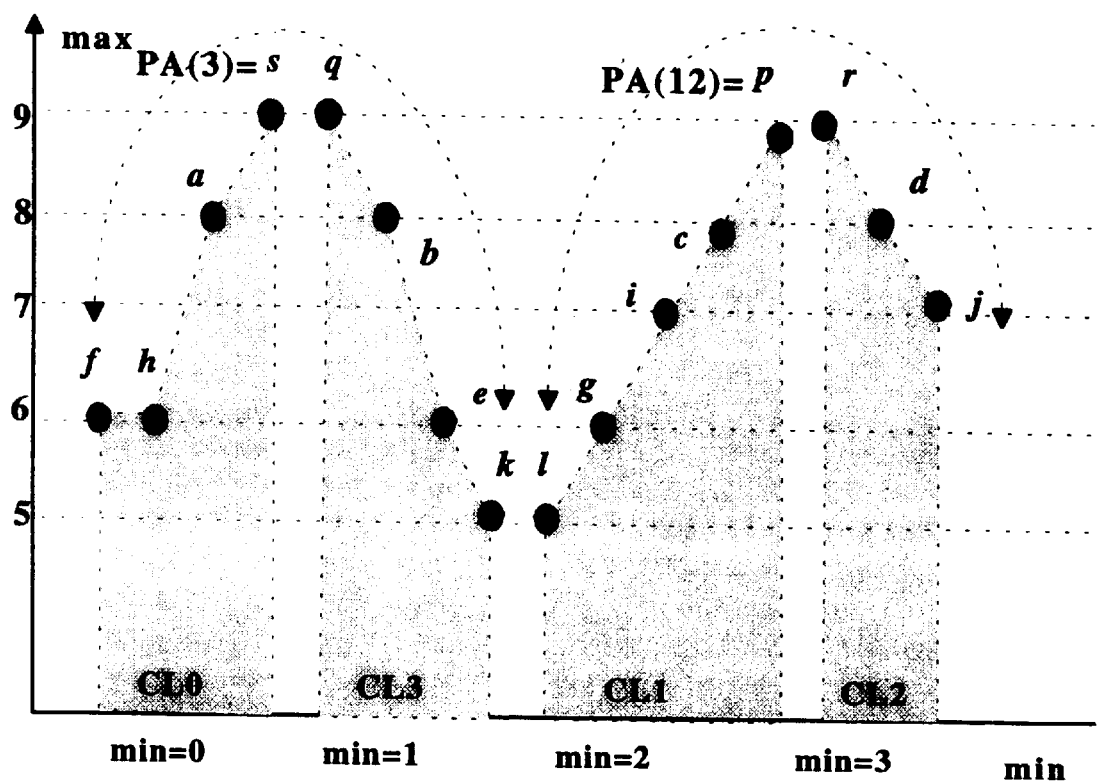
FIG. 3 is a dental chart illustrating TWS data structure resulting from the summarized information quadtree of FIG. 2C

The resulting data structure comprises the Pointer Array and the Class Length List. The resultant TWS can be depicted as a 2D dental chart in FIG. 3. Each discrete point represents one individual cell and each trapezoid area is an equivalent class: $CL_0 \sim CL_3$. This figure can aid in illustrating why this data structure facilitates efficient searching of all S-cells and in savings in processing time.

After the data structure has been created, all of the S-cells must be found. This new data structure facilitates efficient searching of all S-cells and thus saves processing time. To understand how the data structure achieves this result, one skilled in the art should understand the following three properties of the new data structure:

1: For a given threshold, t, a CL, contains one 1-cell $c_{i,j,k}$ then all $CL_r \sim CL_{Q-1}$ contain only 1-cells. Since we already found a 1-cell, $c_{i,j,k}$ in $CL_k$, according to the definition of 1-cell, $\min_{i,j,k} > t$, then $\min_r > t$. On the other hand, CLs have been sorted according to the increasing order of min-field of each CL, so $\min_{Q-1} > \ldots > \min_r > t$, so each of $CL_r \sim CL_{Q-1}$ contain only 1-cells.

2: For a given threshold, t, if there is an S-cell or 0-cell in $CL_i$ then $CL_i$ contain no 1-cells. In the other words, a CL containing 0-cells or S-cells cannot simultaneously contain 1-cells.

3: For a given threshold, t, if $CL_i$ contains a 0-cell $c_{i,j,k}$ then if i is even, all cells in the left side of $C_{i,j,k}$ must be 0-cells; if i is odd, then all cells in the right side of $c_{i,j,k}$ are 0-cells.

In view of these properties, a fast S-cell searching algorithm, called Two-Way Searching Algorithm, or TWSA, is described. Generally, the algorithm begins by finding S-cells in $CL_0$ and $CL_1$, then $CL_2$ and $CL_3$ . . . This pair-by-pair visiting of $(CL_0, CL_1)$, $(CL_2, CL_3)$, . . . $(CL_{2i}, CL_{2i+1})$, will be terminated as soon as one 1-cell is found. To visit each pair of $CL_{2i}$ and $CL_{2i+1}$, the algorithm first identifies the last cell of $CL_{2i}$. According to the data structure of Pointer Array, it should be pointed by Starting_Index=–1, where $Len_i$ is the length of $CL_i$. The algorithm then searches for S-cells of $CL_{2i}$ along index decreasing direction until a 0-cell is identified or all cells in $CL_{2i}$ are tested; then it updates the Starting_Index by Starting_Index+1 and starts to search all S-cells of $CL_{2i+1}$ along index increasing direction.

More particularly, the following are the preferred set of steps for implementing the method described above:

Step 1: Initialize i = 0 and Index = 0, SIZE[–1] = 0;
Step 2: While i < [Q/2] do the following:
    Step 2.1: size =SIZE[2*i]+SIZE[2*i–1], Index=size+Index;
    Step 2.2: Call Search_S-cells( Index, size, Increasing) /* search S-cells for CL2i */
    Step 2.3: Let Index=1+Index;
    Step 2.4: Call Search_S-cells( Index, size, decreasing) */ search S-cells for CL2i+1*/

The Call Search S-cell step in Step 2.2 and 2.4 is preferably performed as a subroutine to execute the steps below:

Step 3: Access the cell pointed by PA[Index] and compute its min-field value; If it is 1-cell then exit whole procedure; otherwise let i=0;
Step 4: While (size > 0)
    Step 4.1: Let q =1 if searching_direction = increasing, or –1 otherwise
    Step 4.2: Index=Index+ $(-1)^q$, size=size–1;
    Step 4.3: Access the cell pointed by PA[Index] and calculate its max-field, if it is greater than t, then exit; otherwise mark it as S-cell.

Using the data structure generated from FIG. 2A as an illustrative sample once again, the following two examples illustrate the TWSA, each example using a different thresholds t.:

EXAMPLE 1 t=7.5

Given t=7.5, the TWSA first visits $CL_0$ by setting initial index=$SIZE_0$=4, and accessing TA(index)=TA(4) which is cell s. Since its (min,max)=(0,9), s is classified as an S-cell. Then the TWSA checks its left neighbor by continuously updating index=index–1 and accessing PA[index], and finds that cell a is an S-cell a and cell h is a 0-cell (because max-field of cell h satisfies max<7.5). So visiting $CL_0$ will be terminated. There is no need to visit other cells in $CL_0$ since it is certain that there are no more S-cells in it. Now the TWSA checks $CL_1$. Similarly, it finds S-cells q and b. In repeating the steps, the TWSA finds all 8 S-cells but it only needs to visit 12 cells.

EXAMPLE 2 t=1.5

Given a threshold t=1.5, the TWSA starts to check $CL_0$ and then $CL_1$ and it finds that all cell in CLs: s, a, h, f, q, b, e and k are S-cells. Then it starts to check $CL_2$. Accessing PA[Index]=PA[13], it finds cell p, since its min=2>t=1.5, and immediately concludes that there is no more S-cells in the last two $CL_2$ and $CL_3$. Thus the whole procedure is completed with checking of only 9 cells, 8 of which are S-cells. Only one cell is of no interest.

2. Comprehensive TWS Data Structure

In the above, it was assumed that the scalar field is evenly distributed. In many situations, however, this assumption might not hold true. For some applications, a scalar field could be digitized as long as 12 bits or more and thus might result in a huge number of CLs. In an extreme case, if each voxel has different density value, then the number of CLs, $Q=\min(O(N^3), 2^{12})$ would be generated. Directly applying the above data structure might be not practically helpful. In this section a modified TWS data structure, or Comprehensive TWS data structure (CTWS), and a modified TWSA, or comprehensive TWSA (CTWSA), are described.

Figure 4:
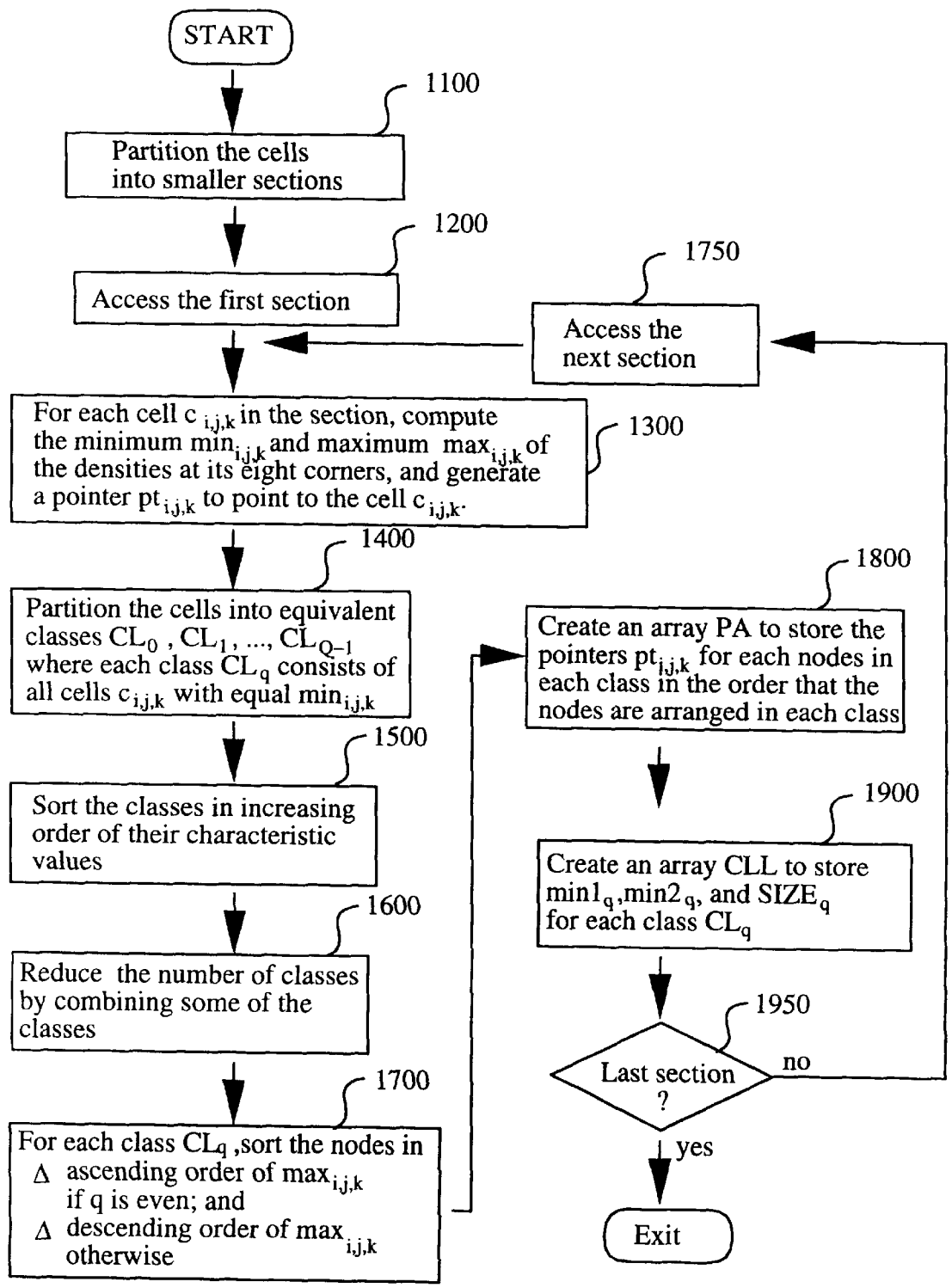
FIG. 4 is a flow diagram illustrating the steps for generating the Comprehensive Two-Way-Sorted (CTWS) data structure.

Generally, the modification of the TWS involves the combining of small CLs to be a large one. A $CL_i$ is defined to be combinable, if its size i.e. number of cells it contains, is less than $N^2$. Otherwise it is deemed non-combinable. The CTWS generating algorithm combines some combinable neighboring CLs to be a bigger one so as to maintain the total number of CLs to be less than 2N. In order to do so, the TWS generating algorithm is modified to form CTWS generating algorithm as illustrated in FIG. 4. One skilled in the art should note that some of steps of CTWS generating algorithm are similar or identical to that of TWS generating algorithm.

Referring now to FIG. 4, the first step 1100 is to partition the cells into smaller sections where each section contains all the cells with the same z-values. Although the it is possible to create the CTWS without this step, it is preferred that it be implemented so as to enhance speed.

Still in step 1100, the number of cells in each section is (N1-1)(N2-1)., and the number of sections is (N3-1). The density values are arranged according to the following order:

(0,0,0), (1,0,0), ..., (N1-1,0,0),
(0,1,0), (1,1,0), ..., (N1-1,1,0),
...,
(0,N2-1,0),(1,N2-1,0), ..., (N1-1,N2-1,0),
(0,0,1),(1,0,1),..., (N1-1,0,1),
(0,1,1),(1,1,1), ..., (N1-1,1,1),
...,
(0,N2-1,1),(1,N2-1,1), ..., (n1-1, N2-1,1),
...,
(0,N2-1,N3-1),(1,N2-1,N3-1), ..., (N1-1,N2-1,N3-1).

However, the density values are not accessed in that order. If the volume data is so big that the entire set of density values cannot be placed in the memory at the same time, then part of the set has to be placed in secondary memory, e.g., hard disk. For example, if a machine only has enough space for (N1-1)*(N2-1) density values, then if one wants to access the density values that is not in the memory, the machine would have to fetch a page of values from disk onto the memory. This wastes time. If the computer has to access density values not inside its memory many times, it would slow down the execution time considerably. However, if the data set is broken down into smaller, more digestible sections such that the entire set of values in a given section can be stored in memory, and only the values in that section are dealt with at any given moment before considering the next section, the speed is much improved.

In step 1200, the first section is accessed. In step 1300, a summarized information pair $(\min_{i,j,k}, \max_{i,j,k})$ and a pointer $pt_{i,j,k}$ pointing to its corresponding $c_{i,j,k}$ are generated for each $c_{i,j,k}$ in the section accessed in step 1200. In step 1400, an equivalent relation is defined as $R=\{(C_{i,j,k}, c_{i',j',k'})|$ if $\min_{i,j,k}=\min_{i',j',k'}\}$ partition all cells into equivalent classes, $CL_q$ where there are Q such equivalent classes, and each $CL_q$ contains all nodes $c_{i,j,k}$ with $\min_{i,j,k}=\min_q$, where $\min_q$ is called the characteristic value of the $CL_q$.

In step 1500, the Q classes are sorted according to increasing order of characteristic value $\min_0\sim\min_{Q-1}$ to get a permutation of CLs, $CL_{s(0)}, CL_{s(1)}, \ldots, CL_{s(Q-1)}$ such that $CL_{s(q)}$ is in the left of $CL_{s(q')}$ if and only it the $\min_{s(q)}<\min_{s(q')}$. After the classes are sorted, the classes are renamed as $CL_0, CL,_1, \ldots, CL_{Q-1}$.

In step 1600, the classes are combined to reduce the total number of classes. The specific preferred steps for combining the classes are described below. In step 1700, the algorithm checks to see if the last section has been reached. If yes, then CTWS generating algorithm is completed. If no, then the next section is accessed in step 1750, and steps 1300 through 1700 are repeated until the last section is reached.

Figure 5:
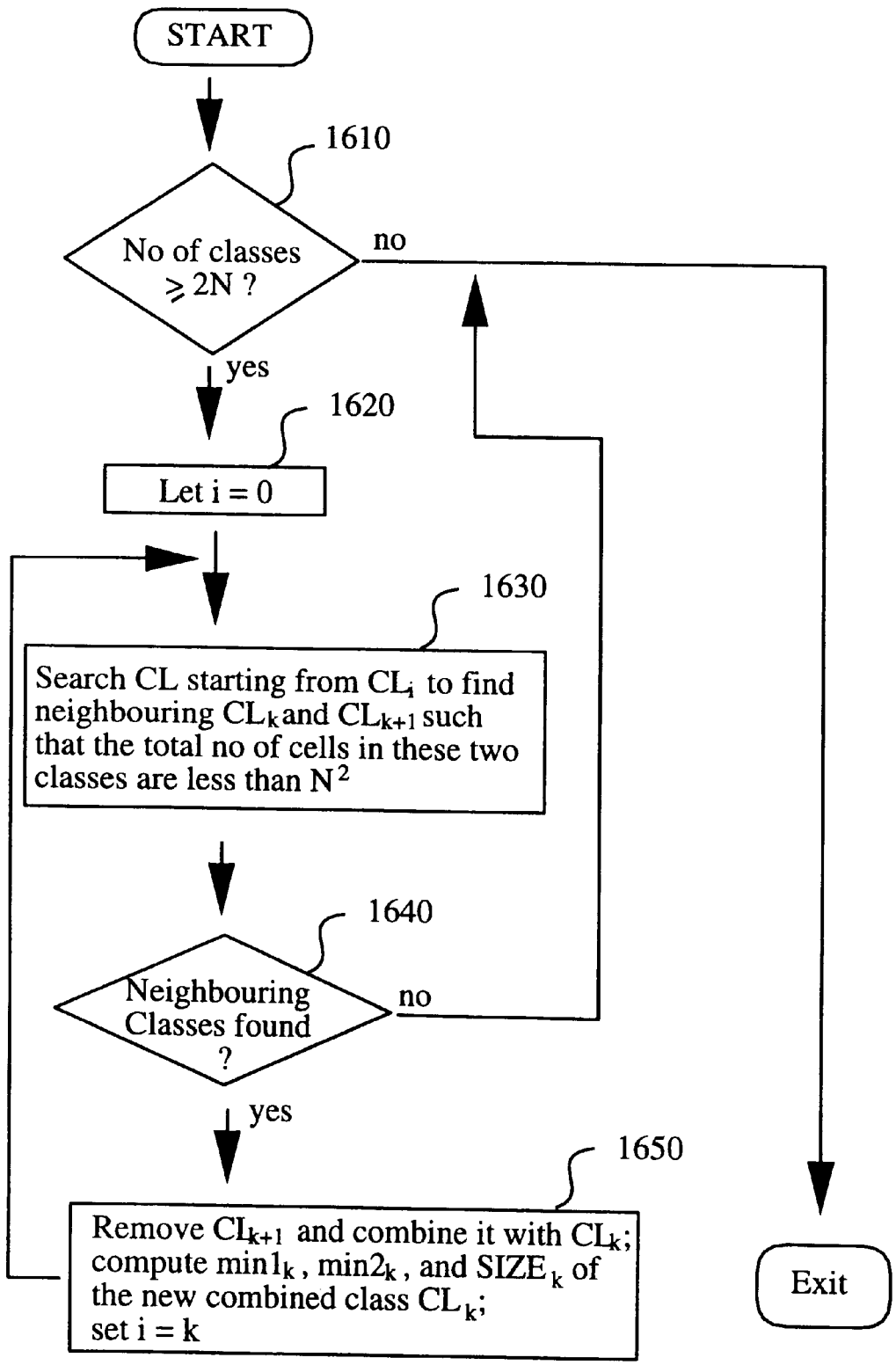
FIG. 5 is a flow diagram illustrating the steps for the subroutine of FIG. 4 to combine classes.

FIG. 5 illustrates the preferred steps for implementing the step 1600 of FIG. 4. In step 1610, it is determined whether the number of classes, Q, is greater than 2N. If Q does not exceed 2N, the step 1660 is executed where all nodes for each class $CL_q$ having an even index q are internally sorted in an increasing order of the max-field, and all nodes for each class $CL_q$ having an odd index q are internally sorted in a decreasing order of the max-field. More formerly, step 1660 can be described as follows: for any two $c_{i,j,k}$ and $c_{i,j,k'}$, $c_{i,j,k}$ will be in the left of $c_{i,j,k'}$, if and only if $(\max_{i,j,k}-\max_{i',j',k'})(-1)^q<0$. In step 1670 a Pointer Array, PA, is generated, taking only the pointer part of each node in each $CC_q$ to fill into a one dimension array. The filling sequence strictly follows the order of each cell appeared in the renamed and sorted set, $CL_0, CL_1, \ldots, CL_{q-1}$. In step 1680, a Class Information List, $CLL_q$, which has Q 3-tuples corresponding to each $CL_q$ is generated where $CLL_q=(\min1_q, \min2_q, SIZE_q)$, where $SIZE_q=\|CL_q\|$, and $\min_q$ and $\min2_q$ define the range of all minefield values of those CLs which are combined together. After step 1680, the algorithm exits to step 1700 of FIG. 4.

If in step 1610, Q is equal to or greater than 2N, then index i is set to 0 in step 1620. In step 1630, the classes are checked in sequential order, $CL_i, CL_{i+1} \ldots$, until a pair of neighboring classes, $CL_k$ and $CL_{k+1}$, are combinable. To be combinable, the total number of cells in the pair must be less than $N^2$. In step 1640, it is determined whether such neighboring pair of classes is found. If found, then steps 1660 through 1680 are executed as described above. If not found, then step 1650 is executed where $CL_{k+1}$ is removed the cells are combined with cells in $CL_k$ so that $CL_k$ will contain all cells in both original CLs. Still in step 1650, $\min1_k$, $\min2_k$, $SIZE_k$ are computed, where $SIZE=\|CL_k\|$, and $\min1_k$ and $\min2_k$ define the range of the min-field values of the pair of classes which are combined together. After step 1650, steps 1630 through 1650 are repeated until no neighboring classes are found in step 1640.

Note that in step 1630, at least one such combinable pair of $CL_k$ and $CL_{k+1}$ will be found. To show this, assume that for each combinable $CL_k$, its left and right neighbors are both non-combinable so there are at most 0.5Q combinable CLs and at least 0.5Q non-combinable CLs each of which contains at least $N^2$ cells, Counting the cells in those non-combinable CLs would yield $0.5Q \times N^2 > 0.5N^4$ cells which conflict with the fact that there are $N^3$ cells. With steps 142 and 144, CLs can be compacted from $Q > N^2$ to be less than 2N.

Figure 6:
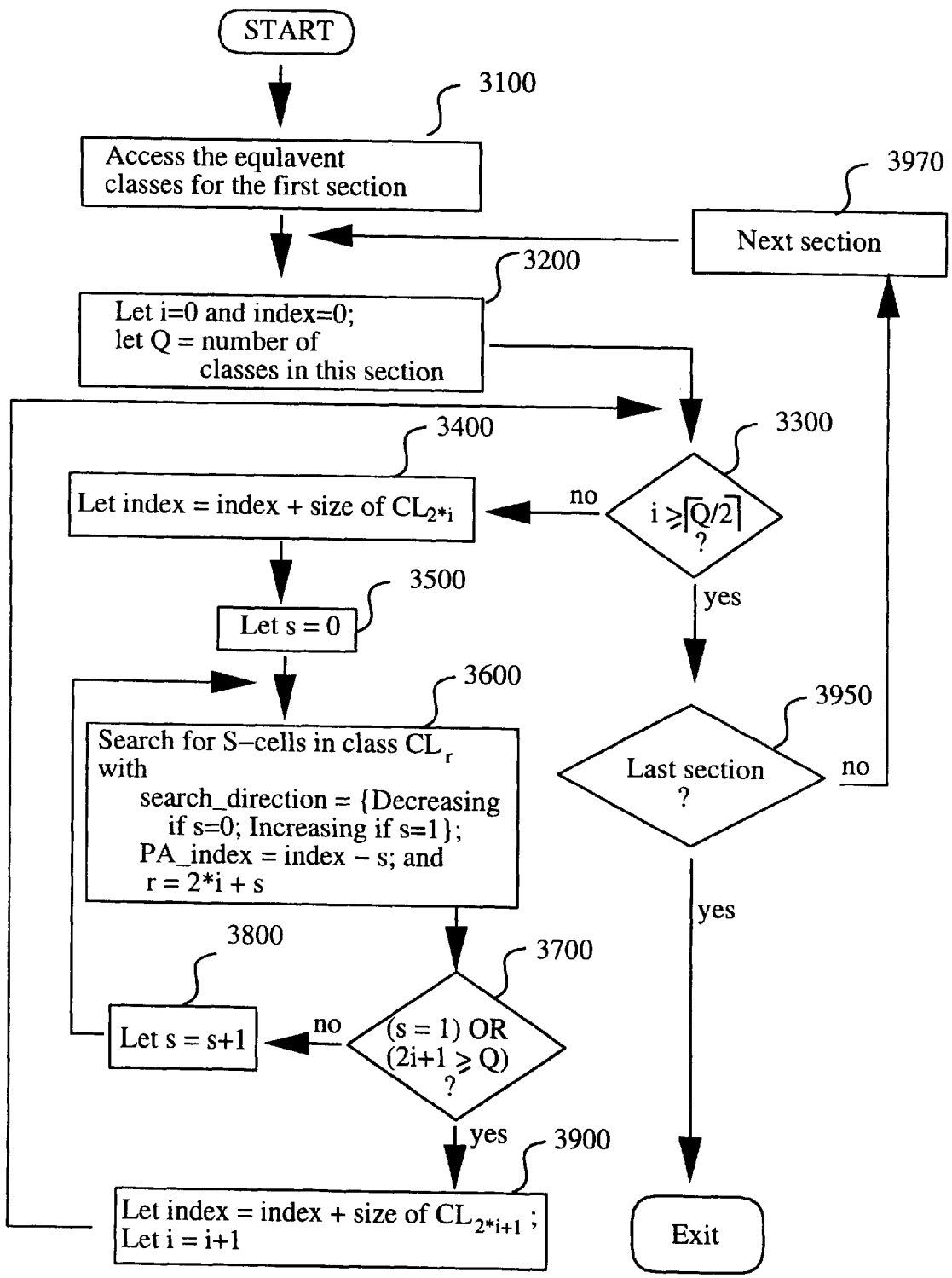
FIG. 6 is a flow diagram illustrating the steps for the Comprehensive Two-Way Searching Algorithm.

Similar to the CTWS generating algorithm, the Two-Way-Sorted Searching Algorithm, TWSA, will also undergo some modification to result in the Comprehensive Two-Way-Sorted searching Algorithm, CTWSA, as illustrated in FIG. 6.

Referring to FIG. 6, the equivalent classes of the first section are accessed in step 3100. In step 3200, indices i and index are set to zero, and Q is set to a value equal to the number of classes in the section, In step 3300, it is determined whether the condition, $i \geq \lceil Q/2 \rceil$, is true. If true then it is checked whether the current section is the last section in step 3950. If the current is the last section, then the algorithm is exited; if not, the next section is accessed in step 3970 and step 3200 is repeated.

If the condition in step 3300 is not true, then index=index+$SIZE_{2i}$, where $SIZE_{2i}$ is the size of $CL_{2i}$, in step 3400. In step 3500, s is set to 0. The S-cell search subroutine is executed in step 3600 with $search_{13}$ direction={decreasing if s=0; and increasing if s=1 }, and $PA_{13}$ index=index+s and r=2i+s. The preferred steps for implementing the subroutine is described in FIG. 7 and below. In step 3700, it is seen whether s=1 or 2i+1>Q. If yes, then step 3900 is executed where index=index+$SIZE_{2i+1}$ and i=i+1. After step 3900, step 3300, which is described above, is executed. If neither of conditions in step 3700 is met then, s=s+1 in step 3800. Thereafter, the subroutine in step 3600 is again performed.

Figure 7:
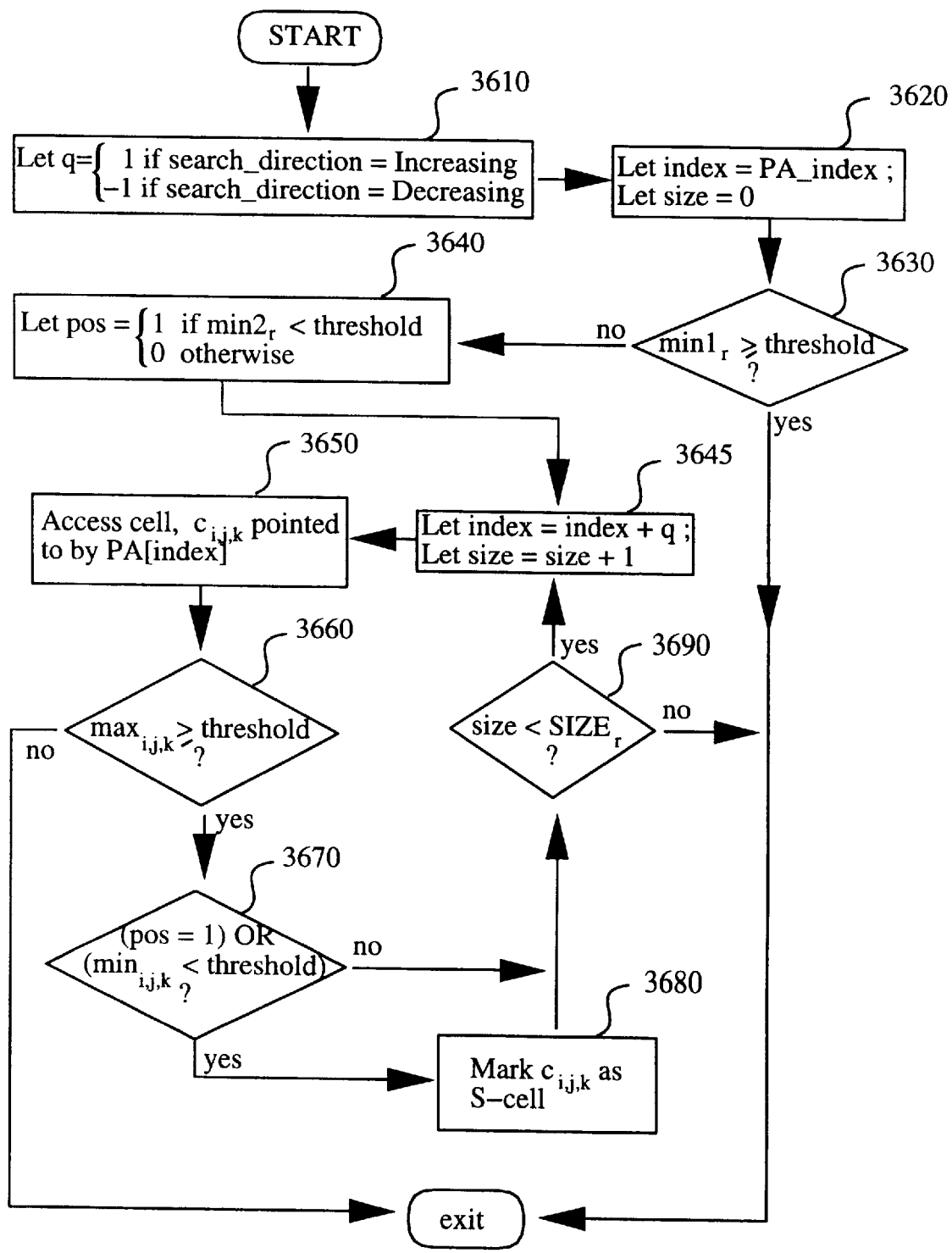
FIG. 7 is a flow diagram illustrating an S-cell searching subroutine of the steps illustrated in FIG. 6.

FIG. 7 illustrates the preferred steps for implementing the S-cell searching subroutine in step 3600 of FIG. 6. In step 3610, q is set to 1 if the search direction is in the increasing order, or s=0; and q is set to −1 is search direction is in the decreasing order, or s=1. In step 3620, index=$PA_{13}$ index and size=0. In step 3630, it is seen whether $min1_r \geq threshold$. If yes, then the subroutine is exited. If no, then in step 3640, pos=1 if $min2_r$<threshold; otherwise, pos=0. In step 3645, index=index+q and size=size+1. In step 3650, the cell, $c_{i,j,k}$ pointed by PA[index] is accessed. In step 3660, it is seen whether $max_{i,j,k} \geq threshold$. If no, then the subroutine is exited. If yes, then step 3670 is executed where it is determined whether pos=1 or $min_{i,j,k}$<threshold. It yes, then the cell, $c_{i,j,k}$, is marked as an S-cell. If no, then step 3690 is executed where it is determined whether size<$SIZE_r$. If no, then the subroutine is exited. If yes, then step 3645, which is described above, is executed once again.

In most cases, the CTWSA process is the same as the TWSA. Only when min1<t<min2, a special treatment is needed, i.e. the algorithm must further check each individual min-field though its max-field has been checked and satisfies with t<max.

The new data structure, whether TWS or CTWS, saves both time and space complexity as compared to the SIO. Although the following will briefly describe the savings as compared to the standard SIO, similar comparison can be made to BONO.

Assuming there are $N \times N \times N$ cells, with $N=2_n$. It is easy to verify that the space used for the standard SIO is $S_{sio}$, $$n = (1+8+8^2 8^3 30 \ldots + 8^n) M_{si} + 8^n M_{pts},$$

where $M_{si}$ and $M_{pt}$ are the memory space requirement of summarized information ($min^q_{i,j,k}$, $max^q_{i,j,k}$) and pointers, respectively. The space requirement for TWS is $S_{tws}$, $n = 8^n M_{pt} + Q \times M_{CLS}$, where $M_{CLS}$ is an 3n-bit integer. Since 0<2N, $S_{sio,n} - S_{tws,n} \sim (8^{n+1} - 1) M_{si}/7$ which means that compared with SIO, it saves space by $O(N^3)$.

The time complexity of TWS depends on the iso-surface of the object because TWS checks all non 1-cells first and terminates whenever it find a first cell with $minq_{i,j,k} > t$. That means only one 1-cell will be checked in the whole procedure. Similarly, for those CLs which have a min<t only one cell with $maxq_{i,j,k}$<t is checked if any. The rest are escaped. With this strategy, the number of the cells to be checked are $S+1+num_{min}$, where $num_{min}$ is the number of CLs which has min<t. For a given t, it is a constant so $T_{Tws,n} = O(S)$.

However, the time complexity of SIO depends on both of the size of the object iso-surface (i.e. the number of S-cells) as well as the object shape. Besides all the S cells must be found which takes O(S) steps, there is an extra cost to travel the octree from root to all S-cells which depends on the distribution of all S-cells. In the worst case, when each node in level n−1 contains at least one S-cell (necessary condition is $S > 2^{3n-3}$), each branch of the octree must be traveled. The traveling cost takes $1+8+8^2+ \ldots +8^n = O(N^3)$. In the best case, when the iso-surface is contained in, say, only 8 S-cells and both belong to one node in level n−1, the traveling cost is O(n). So $O(S+n) < T_{sio}$, $n < O(S+N^3)$. In comparison with SIO, the new data approach is much faster.

3. Iso-Surface Generation and Rendering

Figure 8:
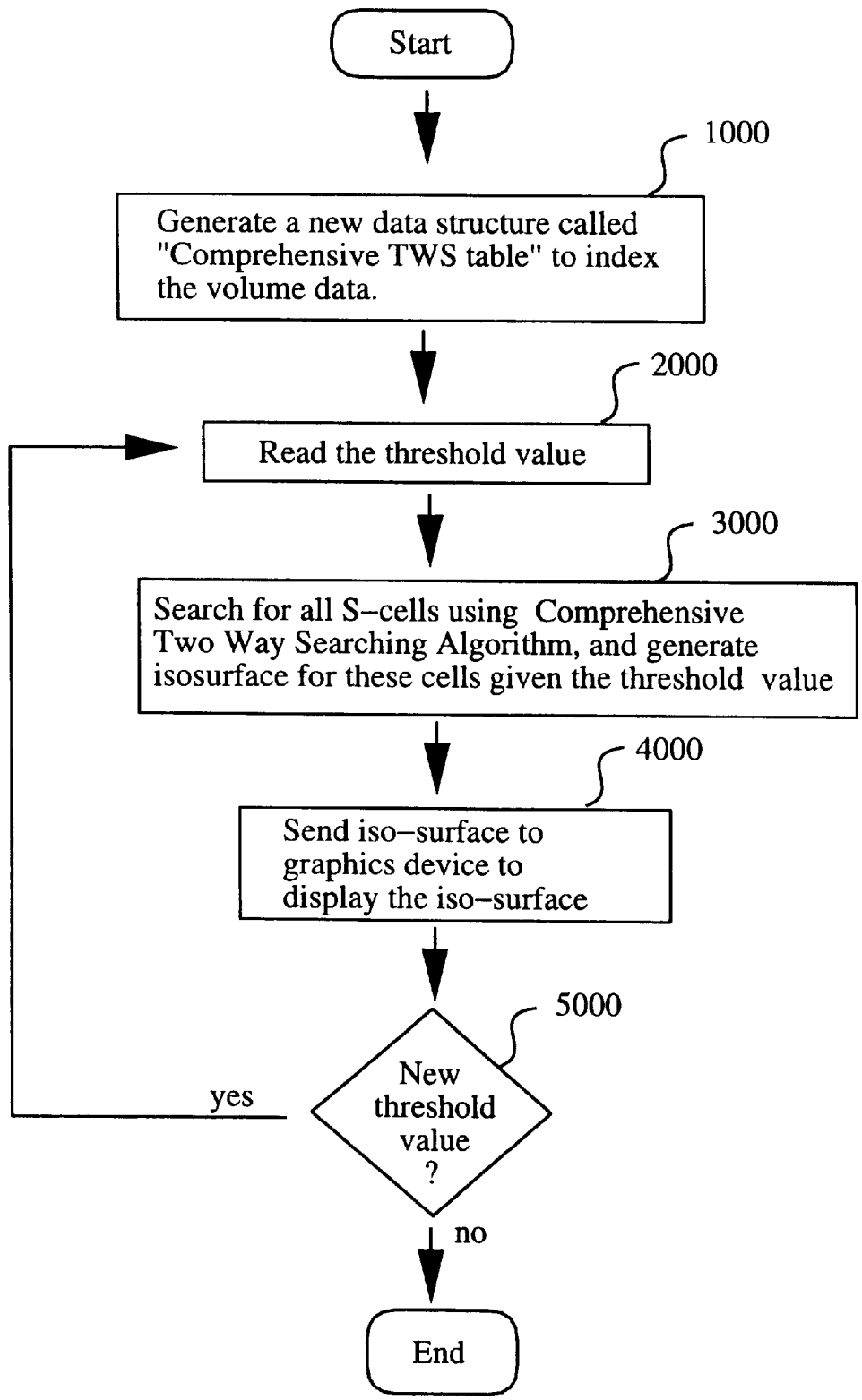
FIG. 8 is a flow diagram illustrating the steps for generating and displaying an iso-surface using the Comprehensive Two-Way Sorted Table (CTWS) data structure.

The FIG. 8 illustrates the general steps for generating the iso-surface of a 3-dimensional object using the CTWS data structure. Although this figure relates only to CTWS, these steps can also be used with TWS data structure. First, the CTWS data structure is created in step 1000. Then the threshold value is read in step 2000. Using the threshold value, the S-cells are searched using the Comprehensive Two-Way-Sorted Searching Algorithm and the iso-surface is generated in step 3000. The information on the iso-surface is sent to a graphics generating device to display the iso-surface in step 4000, In step 5000, it is determined whether there exists a new threshold value. If no, then the surface rendering is completed; if yes, the new threshold value is used and steps 2000 through 5000 are repeated. It is typical in many of the current interactive applications to try many threshold values.

There are currently at least three algorithms available for displaying the surface structure of a 3-dimensional object which is used in step 4000 of FIG. 8. Some of these algorithms are Marching Cubes, Discrete Marching Cubes, and non-linear Marching Cubes algorithms. These three methods are generally well-known to those skilled in the art, and are described in various publications, including U.S. Pat. No. 4,729,098, and U.S. Pat. No. 4,719,585. It should be plain to those skilled in the art that many of these methods can be used in conjunction with the present data structures and S-cell searching algorithms to display the surface structure once all or some of the S-cells have been located. The Marching Cube algorithms in particular can greatly benefit from the present invention.

As mentioned in the Background section, the Marching Cube algorithm contains some ambiguities which can cause the resulting images to have some artificial holes. The ambiguities result from the fact that the 14 cases it uses to display the images do not account for some possible configurations, and configurations which can be interpreted more than one way. In order to alleviate these ambiguities, a new configuration table is provided in FIG. 9.1 through FIG. 9.22. This new configuration table accounts for some of the missing cases found in the Marching Cubes algorithm.

Figure 10:
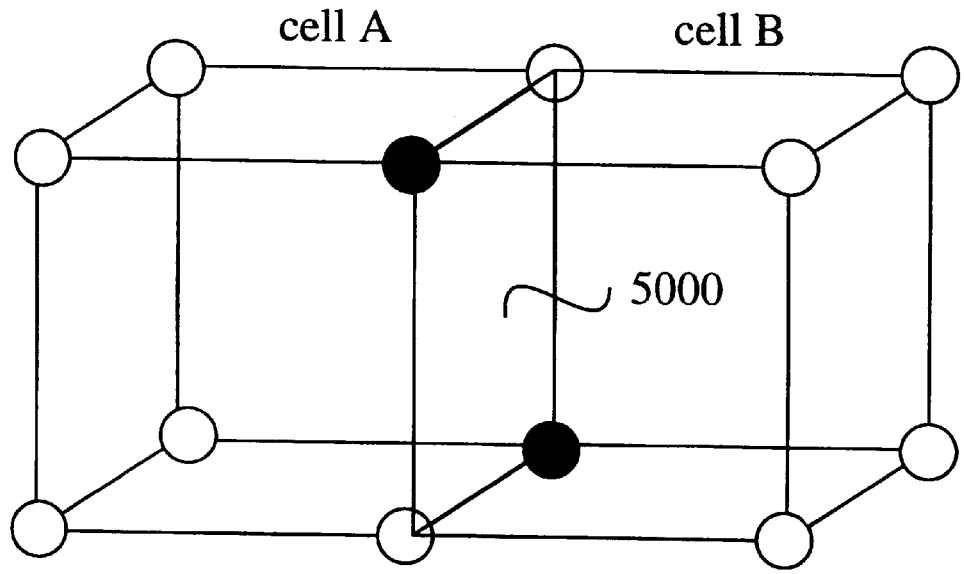
FIG. 10 shows a case which may be interpreted more than one way.
Figure 11:
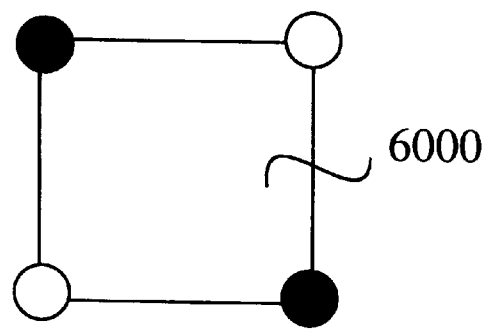
Figure 11:
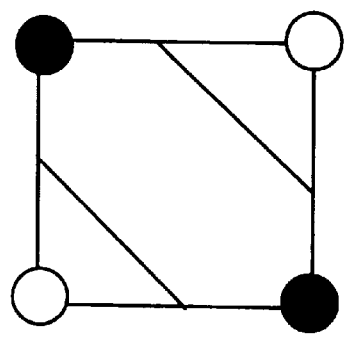
Figure 11:
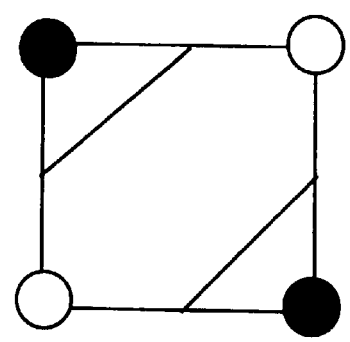
Figure 12:
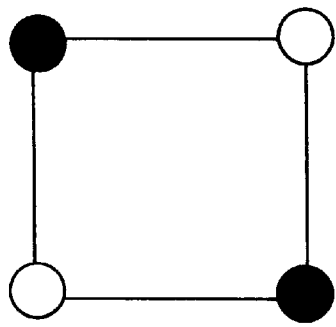
Figure 12:
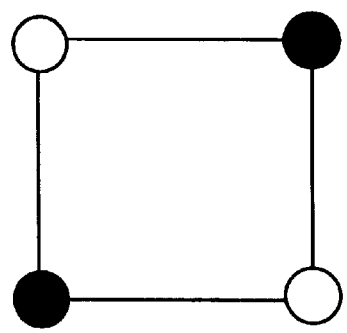
Figure 13:
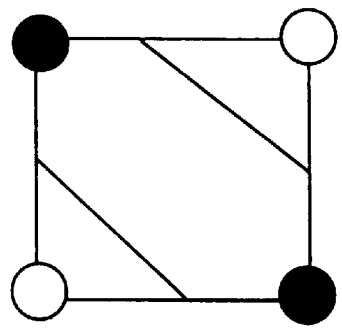
FIG. 13A through FIG. 13D illustrate a solution to the ambiguity illustrated in FIGS. 10 through 12B.
Figure 13:
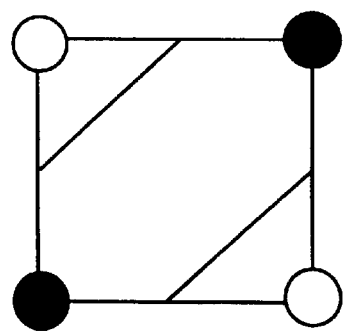

However, some ambiguity may still exists because some configurations may be interpreted more than one way, A configuration which may be interpreted more than one way is illustrated in FIG. 10. Here, the cell labeled "A" and the cell labeled "B" share a common face 5000 as shown in FIG. 10 and 6000 in FIG. 11A. If these two cells produce polygons that do not match as demonstrated in FIG. 11B and FIG. 11C, ambiguity results. One way to resolve this ambiguity is to standardize the way polygons are generated. To do so, it is important to understand that the ambiguity will result only when the two adjacent cells share a common face as shown in FIG. 12A and 12B. One way to avoid the ambiguity is to generate the polygons such that they cut the face in the manner illustrated in FIG. 13A and FIG. 13B. In the alternative, the polygons can be generated such that they cut the face in the manner illustrated in FIG. 13C and FIG. 13D.

While the present invention has been described in detail herein in accord with certain preferred embodiments thereof, many modifications and changes therein may be effected by those skilled in the art. Accordingly, it is intended by the appended claims to cover all such modifications and changes as falling within the true spirit and scope of the present invention.

We claim:

1. An apparatus for generating a computationally efficient two-way-sorted data structure to be used for mapping and displaying surface structure of a three dimensional object, said apparatus comprising:

a memory means for storing set of volume data, said volume data comprising N×N×N cells, each cell having 8 voxels, each voxel representing a value of at least one physical property associated with the three dimensional object;

a processor means for manipulating said volume data to generate a data structure, said data structure including a pointer array comprising pointers, each pointer corresponding to each cell from said volume data, each cell containing a set of summarized information pair values, $min_{i,j,k}$, $max_{i,j,k}$, said cells being partitioned into plurality of classes and arranged in a sequential order within each of said classes such that for a given threshold, t, no 0-cells, S-cells and 1-cells are in a same class, if a class $CL_r$ contains one 1-cell then all $CL_r \sim CL_{Q-1}$ contain only 1-cells, all 0-cells are on a left side of all S-cells in a class having an even index, and all 0-cells are on a right side of all S-cells in a class having an odd index, said classes arranged in a sequential order as determined by a characteristic value of each class, said pointers arranged in a same sequence as said cells; and a class length list comprising a list of values, each value representing a number of cells in each of said classes;

whereby said data structure facilitates rapid searching of all S-cells from said volume data.

2. A two-way-sorted method of generating computationally efficient data structure to be used for displaying surface structure of a three dimensional object from a set of volume data stored as memory in a computing means, said volume data comprising N×N×N cells, each cell having 8 voxels, each voxel representing a value of at least one physical property associated with the three dimensional body, said method comprising:

generating a set of summarized information pair values, $min_{i,j,k}$, $max_{i,j,k}$, for each cell from said volume data, said $min_{i,j,k}$ representing a lowest voxel value and said $max_{i,j,k}$ representing a highest voxel value, each pair having a pointer, $pt_{i,j,k}$ for pointing to its corresponding cell, partitioning said cells into Q equivalent classes, each class containing cells having an identical value for $min_{i,j,k}$, each of the classes, $CL_q$, having assigned a characteristic value, $min_q$, which is equivalent to the value for $min_{i,j,k}$ corresponding to said class $CL_q$;

sorting said classes such that said classes are in an order of increasing $min_q$ value;

assigning an index q to each of said classes in a sequential manner such that a class having a lowest $min_q$ value is assigned an index of 0 and each subsequent class is assigned an index which is one greater than a previous class;

sorting classes having an even q index such that cells contained in said classes are in an order of increasing $max_{i,j,k}$ values corresponding to each of said cells;

sorting classes having an odd q index such that cells contained in said classes are in an order of decreasing $max_{i,j,k}$ values corresponding to each of said cells;

generating a pointer array comprising pointers for each of said cells, said pointers arranged in a sequence consistent to a sequence of the cells; and generating a class length list, CLL, comprising a list of values, $SIZE_k$, representing a number of cells in each of said classes;

whereby said data structure facilitates rapid extraction of all S-cells from said volume data using said computing means.

3. A comprehensive two-way-sorted method of generating computationally efficient data structure using a computing means, said data structure to be used for displaying surface structure of a three dimensional object from a set of volume data stored as memory in said computing means, said volume data comprising N×N×N cells, each cell having 8 voxels, each voxel representing a value of at least one physical property associated with the three dimensional body, said method comprising:

partitioning the cells into sections;

accessing said cells sequentially;

generating a set of summarized information pair values, $min_{i,j,k}$, $max_{i,j,k}$, for each cell from each of said sections, said $min_{i,j,k}$ representing a lowest voxel value and said $max_{i,j,k}$ representing a highest voxel value, each pair having a pointer, $pt_{i,j,k}$ for pointing to its corresponding cell, partitioning said cells into Q equivalent classes, each class containing cells having an identical value for $min_{i,j,k}$, each of the classes, $CL_q$, having assigned a characteristic value, $min_q$, which is equivalent to the value for $min_{i,j,k}$ corresponding to said class $CL_q$;

sorting said classes such that said classes are in an order of increasing $min_q$ value;

combining classes based on pre-determined criteria;

assigning an index q to each of said classes in a sequential manner such that a class having a lowest $min_q$ value is assigned an index q of 0 and each subsequent class is assigned an index q which is one greater than a previous class;

sorting classes having an index q which is even such that cells contained in said classes are in an order of increasing $max_{i,j,k}$ values corresponding to each of said cells;

sorting classes having an index q which is odd such that cells contained in said classes are in an order of decreasing $max_{i,j,k}$ values corresponding to each of said cells;

generating a pointer array comprising pointers for each of said cells, said pointers arranged in a sequence consistent with the cells; and generating a class information list comprising, $CLL_q$, corresponding to each $CL_q$, the $CLL_q$ including $min1_q$, $min2_q$, $SIZE_q$;

whereby said data structure facilitates rapid extraction of all S-cells from said volume data using said computing means.

4. The method as recited in claim 3 wherein said combining step comprises:
   a) sequentially searching the classes for neighboring classes $CL_k$ and $CL_{k+1}$ where a total number of cells in the two neighboring classes is less than $N^2$; and
   b) combining $CL_k$ and $CL_{k+1}$ such that $CL_k$ contains cells contained in $CL_{k+1}$ and $CL_{k+1}$ is eliminated;
   wherein said steps a) and b) are performed only when a total number of classes is greater or equal to 2N.

5. A two-way-sorted method of extracting S-cells from a data structure, said data structure comprising a pointer array comprising pointers, each pointer corresponding to each cell from said volume data, each cell containing a set of summarized information pair values, $min_{i,j,k}$, $max_{i,j,k}$, said cells being partitioned into plurality of classes and arranged in a sequential order within each of said classes such that for a given threshold, t, no 0-cells, S-cells and 1-cells are in a same class, if a class $CL_r$ contains one 1-cell then all $CL_r$~$CL_{Q-1}$ contain only 1-cells, all 0-cells are on a left side of all S-cells in a class having an even index, and all 0-cells are on a right side of all S-cells in a class having an odd index, said classes arranged in a sequential order as determined by a characteristic value of each class, said pointers arranged in a same sequence as said cells; and a class length list comprising a list of values, each value representing a number of cells in each of said classes;

said method comprising:
   sequentially accessing the classes pair by pair, each pair containing one class with an even index and one class with an odd index;
   searching for S-cells in a class having an even index in an accessed pair along index decreasing direction;
   searching for S-cells in a class having an odd index in an accessed pair along index increasing direction;
   terminating the search for all classes if a 1-cell is found;
   terminating the search for the class and moving to a next class and searching for S-cells if a 0-cell is found in the class; and
   marking all S-cells found.

6. A Comprehensive Two-Way-Sorted method of extracting S-cells from a data structure, said data structure generated using a computing means, said data structure to be used for displaying surface structure of a three dimensional object from a set of volume data stored as memory in said computing means, said volume data comprising N×N×N cells, each cell having 8 voxels, each voxel representing a value of at least one physical property associated with the three dimensional body, said method comprising:
   reading a threshold value, t;
   sequentially accessing said sections;
   sequentially accessing said cells in each of said classes in a section in a increasing direction if an index of said class is odd;
   sequentially accessing said cells in each of said classes in a section in a decreasing direction if an index of said class is even;
   marking a cell as an S-cell if its corresponding $max_{i,j,k}$ is greater than or equal to said threshold and Pos=1;
   marking a cell as an S-cell it its corresponding $max_{i,j,k}$ is greater than or equal to said threshold and $min_{i,j,k}$ is less than the threshold;
   terminating the search if min1 is greater than or equal to said threshold;
   searching S-cells in a next class if $max_{i,j,k}$ is less than the threshold; and
   continuing with the search until all of the classes have been accessed.

7. A two-way-sorted system for displaying three dimensional surface structure from a set of stored volume data and based on a threshold t, said volume data comprising N×N×N cells, each cell having 8 voxels, each voxel representing a value of at least one physical property associated with a three dimensional body, said method comprising:
   first generating means for generating a set of summarized information pair values, $min_{i,j,k}$, $max_{i,j,k}$, for each cell from said volume data, said $min_{i,j,k}$ representing a lowest voxel value and said $max_{i,j,k}$ representing a highest voxel value, each pair having a pointer, $pt_{i,j,k}$ for pointing to its corresponding cell,
   partitioning means for partitioning said cells into Q equivalent classes, each class containing cells having an identical value for $min_{i,j,k}$, each of the classes, $CL_q$, having assigned a characteristic value, $min_q$, which is equivalent to the value for $min_{i,j,k}$ corresponding to said class $CL_q$;
   sorting means for sorting said classes are in an order of increasing $min_q$ value wherein each class is assigned an index q in a sequential manner, a set of classes having an even index q having their corresponding cells sorted in an order of increasing $max_{i,j,k}$ values, and a set of classes having an odd index q having their corresponding cells sorted in an order of decreasing $max_{i,j,k}$ values
   second generating means for generating a pointer array comprising pointers for each of said cells, said pointers arranged in a sequence identical to a sequence of cells as sorted by said sorting means, and for generating a class length list, CLL, comprising a list of values, $SIZE_k$, representing a number of cells in each of said classes;
   accessing means for accessing cells from a pair of classes in a sequential manner starting from a pair of classes having a lowest even and odd q index;
   comparing means for comparing $min_{i,j,k}$ and $max_{i,j,k}$ values corresponding to a cell to a threshold t;
   marking means for marking all S-cells;
   display means for displaying said surface structure using said S-cells;
   whereby each cell in a class having an even q index is sequentially compared with said threshold t beginning with a right most cell, and each cell in a class having an odd q index is sequentially compared with said threshold t beginning with a left most cell, wherein the search is terminated if any cell in a pair of classes is a 1-cell, an odd class in a pair of classes is accessed if any cell in the class having an even q index is a 0-cell, and a next pair of classes is accessed if any cell in the class having an odd q index is a 0-cell.

8. A comprehensive two-way-sorted apparatus for displaying three dimensional surface structure from a set of stored volume data and based on a threshold t, said volume data comprising N×N×N cells, each cell having 8 voxels, each voxel representing a value of at least one physical property associated with a three dimensional body, said method comprising:

first generating means for generating a set of summarized information pair values, $\min_{i,j,k}$, $\max_{i,j,k}$, for each cell from said volume data, said $\min_{i,j,k}$ representing a lowest voxel value and said $\max_{i,j,k}$ representing a highest voxel value, each pair having a pointer, $pt_{i,j,k}$ for pointing to its corresponding cell, partitioning means for partitioning said cells into Q equivalent classes, each class containing cells having an identical value for $\min_{i,j,k}$, each of the classes, $CL_q$, having assigned a characteristic value, $\min_q$, which is equivalent to the value for $\min_{i,j,k}$ corresponding to said class $CL_q$;

sorting means for sorting said classes are in an order of increasing $\min_q$ value wherein each class is assigned an index q in a sequential manner, a set of classes having an even index q having their corresponding cells sorted in an order of increasing $\max_{i,j,k}$ values, and a set of classes having an odd index q having their corresponding cells sorted in an order of decreasing $\max_{i,j,k}$ values combining means for combining $CL_k$ and $GL_{k+1}$ such that $CL_k$ contains cells contained in $CL_{k+1}$ and $CL_{k+1}$ is eliminated if a number of cells in each of $CL_k$ and $CL_{k+1}$ is less than $N^2$, and not combining if a number of cells in each of $CL_k$ and $CL_{k+1}$ is not less than $N^2$, second generating means for generating class information list comprising, $CLL_q$, corresponding to each $CL_q$, the $CLL_q$ including $min1_q$, $min2_q$, $SIZE_q$;

accessing means for accessing cells from a pair of classes in a sequential manner starting from a pair of classes having a lowest even and odd q index;

comparing means for comparing $\min_{i,j,k}$ and $\max_{i,j,k}$ values corresponding to a cell to a threshold t;

marking means for marking all S-cells;

display means for displaying said surface structure using said S-cells;

whereby each cell in a class having an even q index is sequentially compared with said threshold t beginning with a right most cell, and each cell in a class having an odd q index is sequentially compared with said threshold t beginning with a left most cell, wherein the search is terminated if any cell in a pair of classes is a 1-cell, an odd class in a pair of classes is accessed if any cell in the class having an even q index is a 0-cell, and a next pair of classes is accessed if any cell in the class having an odd q index is a 0-cell.

* * * * *